United States Patent

Hagersten et al.

[19]

[11] Patent Number: 5,987,549
[45] Date of Patent: *Nov. 16, 1999

[54] METHOD AND APPARATUS PROVIDING SHORT LATENCY ROUND-ROBIN ARBITRATION FOR ACCESS TO A SHARED RESOURCE

[75] Inventors: Erik Hagersten, Palo Alto; Ashok Singhal, Redwood City, both of Calif.

[73] Assignee: Sun Microsystems, Inc., Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/675,286

[22] Filed: Jul. 1, 1996

[51] Int. Cl.$^6$ ................................................. G06F 13/00
[52] U.S. Cl. ........................... 710/107; 710/119; 710/120
[58] Field of Search ................................. 395/299, 300; 710/119, 120, 121, 107

[56] References Cited

U.S. PATENT DOCUMENTS 4,873,626 10/1989 Gifford ........................................ 395/300
5,396,602 3/1995 Amini ........................................ 395/300

*Primary Examiner*—Ayaz R. Sheikh
*Assistant Examiner*—David A. Wiley
*Attorney, Agent, or Firm*—Flehr Hohbach Test Albritton & Herbert LLP

[57] ABSTRACT

Low-latency distributed round-robin arbitration is used to grant requests for access to a shared resource such as a computer system bus. A plurality of circuit board cards that each include two devices such as CPUs, I/O units, and ram and an address controller plugs into an Address Bus in the bus system. Each address controller contains logic implementing the arbitration mechanism with a two-level hierarchy: a single top arbitrator and preferably four leaf arbitrators. Each address controller is coupled to two devices and the logical "OR" of their arbitration request is coupled via an Arbitration Bus to other address controllers on other boards. Each leaf arbitrator has four prioritized request in lines, each such line being coupled to a single address controller serviced by that leaf arbitrator. By default, each leaf arbitrator and the top arbitrator implement a prioritized algorithm. However a last winner ("LW") state is maintained at every arbitrator that overrides the default, to provide round-robin selection. Each leaf arbitrator arbitrates among the zero to four requests it sees, selects a winner and signals the top arbitrator that it has a device wishing access. At the top arbitrator, if the first leaf arbitrator last won a grant, it now has lowest grant priority, and a grant will go to the next highest leaf arbitrator having a device seeking access.

20 Claims, 9 Drawing Sheets

METHOD AND APPARATUS PROVIDING SHORT LATENCY ROUND-ROBIN ARBITRATION FOR ACCESS TO A SHARED RESOURCE

FIELD OF THE INVENTION

The invention relates to computer bus architecture in general, and more specifically to methods and apparatuses that arbitrate access to a shared resource such as a system bus.

BACKGROUND OF THE INVENTION

Modern computer systems including servers, workstations, and the like typically have several devices such as input/output ("I/O" or "IO") units that can cache lines of memory, or central processor units ("CPU's") or microprocessors, and associated distributed CPU random access memory units ("RAM"). (As used herein, the terms "CPU" and "device" shall be used interchangeably.) The various devices can communicate with each other and with RAM through one or more buses that can carry various information including requests, commands, memory addresses, data, and the like between the various devices. Such information is transmitted in packets over a bus line that is typically many bits wide, for example 64-bits or eight-bytes at a transmission rate that is affected by the system clock frequency.

The main memory of a computer system usually has large storage capacity and but is relatively slow in accessing data. To achieve faster access to data, and to access main memory less frequently many devices (and especially CPUs) have a small fast local memory, called a cache. The cache is used to store a copy of frequently and recently used data so that the device can access the cache instead of the main memory.

Several techniques are known in the art whereby a device writes data to a memory location that is in its cache. In a so-called "write through" cache, the data can be written to the cache as well as to main memory. Alternatively, in a "write back" (or "copy back") cache, the data can be written to the cache only. In write back cache, the data in main memory is "state" in that it is no longer correct, and only the cache holds a correct copy of the memory location. The modified copy of data in the cache is called "dirty". When the dirty data must be removed from the cache (to make room for a copy of a different memory location), the dirty data must be written back to memory. Although the present invention is described with respect to a computer system using write back caches, the invention could also be generalized for use with write through caches as well.

Understandably, cache coherence is important. If multiple devices have local copies of the same memory location in their caches, correct system operation dictates that all devices must observe the same data in their caches (since they are meant to hold copies of the same memory location). But if one or more devices write to their local copy of the data in their caches, all devices may no longer observe the same data. Cache coherence is the task of ensuring that all devices observe the same data in their caches for the same memory location. This is done by updating copies of the data in all other caches, or by deleting copies of the data in all other caches, when any device modifies data in its cache. Although the present invention is described with respect to use with a system using the second type of cache coherence, either type coherence may in fact be used. Note that if write back caches are used, when devices want a copy of a memory location that is dirty in another cache, the data must be obtained from the cache with the dirty data, and not from memory (since the data in memory is stale).

A so-called snooping protocol is a common technique for implementing cache coherence. Each cache maintains the state for each of the memory locations in the cache. When a device wishes to read or write a memory location, it broadcasts its request, usually over a bus. That request is observed and checked against the state by all devices, e.g., the request is "snooped". For read requests, caches with dirty copies respond with data rather than memory. For write requests, all other caches invalidate or update their copy of the data.

Transactions usually involve a request with the address followed by a response with the data. In so-called "circuit switched" buses, a transaction has to complete before a subsequent transaction can start. If there is a long delay between the request and the response, the bus remains idle for the duration of the delay, with resultant loss of bus bandwidth. By contrast, co-called "split transaction" (or "packet switched") buses allow requests and responses for other transactions in between the request and response for a given transaction. This allows the full bandwidth of the bus to be utilized, even if there are delays between the request and the response for a given transaction.

A CPU wishing to read data from a memory location, or to write data to a memory location typically will first broadcast a request-type signal to the system, over a system bus. However, other devices may also need to broadcast the same signal at the same time over the bus. But since only one signal value at a time may be transmitted on the bus, the devices must arbitrate for the use of the bus, and a mechanism implementing arbitration is provided. Further, the common system bus that carries these requests and the data and other signals is a finite resource, whose transmission bandwidth is fixed by the number of bit lines and system clock rate.

Several arbitration mechanisms are known in the art. In the so-called fair algorithm, the arbitrator grants bus access to CPUs in the order the requests arrive, e.g., access is granted to the CPU whose request has been pending the longest time. No priority of importance is assigned to the individual CPU requests, and the sole criterion is the time order of the various requests. Unfortunately, this algorithm requires substantial state and logic depth, and is difficult to implement.

Another prior art method is the so-called round robin algorithm, in which a cyclic order is defined among CPUs such that the identity of the most favored requestor-CPU moves. Thus, if CPU N received the most recent arbitration grant, then CPU N+1 has the highest priority if CPU N+1 asserts a request. While round-robin algorithms have found favor with computer system architects, such algorithms are difficult to implement with a small logic depth if the number of competitors is large. Further, a deep hierarchical level round-robin take too many clock cycles to determine the grant winner because winners must be determined at each of a plurality of lower levels, after which a winner is determined from among the lower level winners.

Yet another prior art algorithm prioritizes the various CPUs statically. Thus, CPU 0 is permanently assigned highest priority, CPU 1 is assigned the next highest priority, and so on. As a result, CPU 2 cannot receive an arbitration grant unless neither CPU 0 nor CPU 1 presently request bus access. This static prioritization scheme has the advantage of being especially easy to implement.

Using any of the above techniques, while the requesting CPU that receives a bus access grant from the arbitrator is gaining access, the requests from any other requesting CPUs must wait in a blocked or pending state. The blocked or pending state continues until the requesting CPU receives its arbitration grant, places its data or desired address or other signal on the bus and thus completes its transaction.

In the prior art, regardless of the mechanism used to arbitrate competing requests for access to the bus, one arbitration line would be used for data, and a second arbitration line would be used for addresses. As noted, during the time of arbitration, grant, and access by the CPU winning grant access, other pending requests are temporarily blocked pending competition of the first granted request.

While such techniques work, the latency penalty can be excessive in that many clock cycles must pass between a first CPU request, a grant of arbitration to that CPU, CPU access to the bus, and then a grant of arbitration and bus access to the next requestor to receive bus access.

There is a need for a method and apparatus for arbitrating access to a bus in which blocking mechanisms are not used, and in which a minimal latency time is achieved.

The present invention provides such an arbitration method and apparatus.

SUMMARY OF THE PRESENT INVENTION

In a computer system in which many CPUs (or devices) can access a shared system bus that includes separate Address and Arbitration Buses, among other buses, access to the Address Bus must be rapidly arbitrated. The present invention provides a low latency distributed round-robin type arbitration mechanism that provides the simplicity of fixed prioritized arbitration, but in a low-level hierarchial manner.

Preferably two CPUs and associated RAM are provided on each of a plurality of cards that can hot-plug into the shared system bus. Each card includes an address controller ("AC") containing logic implementing the arbitration mechanism with two-level hierarchy. Each address controller is coupled to two CPUs, and the logical "OR" function of their arbitration request is communicated via the arbitration bus to the other address controllers, there being sixteen such arbitration signals. Each address controller includes four leaf level arbitrators and a single top arbitrator. Between the top arbitrator and each leaf arbitrator there is an upward directed request line ("rout"), an upward directed winner-to-the-right ("wrgt") line, and a downward directed grant line ("win"). Each leaf arbitrator has four request in lines ("rin"), each such line corresponding to a single address controller serviced by that leaf arbitrator.

Thus, a 16-way arbitration is implemented using four 4-way leaf arbitrators that each judge among groups of up to four requesting address controller units, and a fifth 4-way top arbitrator that decides which of the four leaf arbitrators may currently grant an access request. Each leaf arbitrator functions independently in arbitrating a potential winner among its four contenders, but an ultimate grant of arbitration is qualified upon the leaf arbitrator receiving a Grant from the top arbitrator.

Each leaf arbitrator and top arbitrator implements a prioritized algorithm as a default. However, a last winner ("LW") state is maintained at each leaf arbitrator and at the top arbitrator that overrides the default algorithm to provide a round-robin selection.

A CPU wanting to arbitrate for Address Bus access initiates a Request to the top arbitrator through the rin line to the leaf arbitrator to which it is coupled. (Note that in each address controller, one leaf arbitrator is coupled to this line.) Each local leaf arbitrator arbitrates among the zero to four Requests that may be present on its rin lines and decides the winner among its requestors and outputs a signal on an rout line to the top arbitrator indicating that it has a CPU wishing access. The rin lines are prioritized such that CPU0>CPU1>CPU2>CPU3 in terms of priority. A last winner ("LW") pointer mechanism is present in each leaf arbitrator and moves to the right after an arbitration award. From the perspective of the top arbitrator, the leaf arbitrators are prioritized such that the first leaf arbitrator has priority over the second leaf arbitrator which has priority over the third leaf arbitrator which has priority over the fourth leaf arbitrator. The top arbitrator has an LW pointer, similar to the leaf arbitrators.

Each card's address controller communicates with the Arbitration Bus (among other buses). This permits the arbitration mechanism on each card simultaneously and synchronously to see all arbitration requests and top arbitrator grants, and to have identical LW states.

Leaf level arbitration is autonomous and occurs in parallel. For example, if CPU0 last won leaf level arbitration, it now has the lowest priority among the preferably four rin at this leaf arbitrator, and leaf arbitrator one will request a grant for its CPU1, if it requests access. Within the second leaf arbitrator, if CPU5 won last time, it now has the lowest priority and CPU6 can win now (if it requests). At the top arbitrator level, if the first leaf arbitrator last won a grant, it now receives the lowest priority, and the second leaf arbitrator wins, which is to say its CPU6 can win the arbitration grant.

Last winner pointers are synchronously changed or set once per system clock cycle. Shorter latency results in the preferred embodiment because an address packet can be broadcast simultaneously with arbitration for the Address Bus. This is faster than prior art schemes of arbitrating first and then putting out the address packet. The arbitration is distributed in that each address control includes an autonomous arbitration unit. While leaf level arbitration is underway, the top arbitrator can decide from its LW pointer which leaf arbitrator shall win the arbitration grant.

Other features and advantages of the invention will appear from the following description in which the preferred embodiments have been set forth in detail, in conjunction with the accompanying drawings.

DETAILED DESCRIPTION OF THE PREFERRED EMBODIMENT

The present invention provides a low latency, distributed hierarchical round-robin type mechanism using fixed priority approaches to rapidly arbitrate access to a shared system resource in a computer environment, namely an address bus shared by many CPUs.

Figure 1:
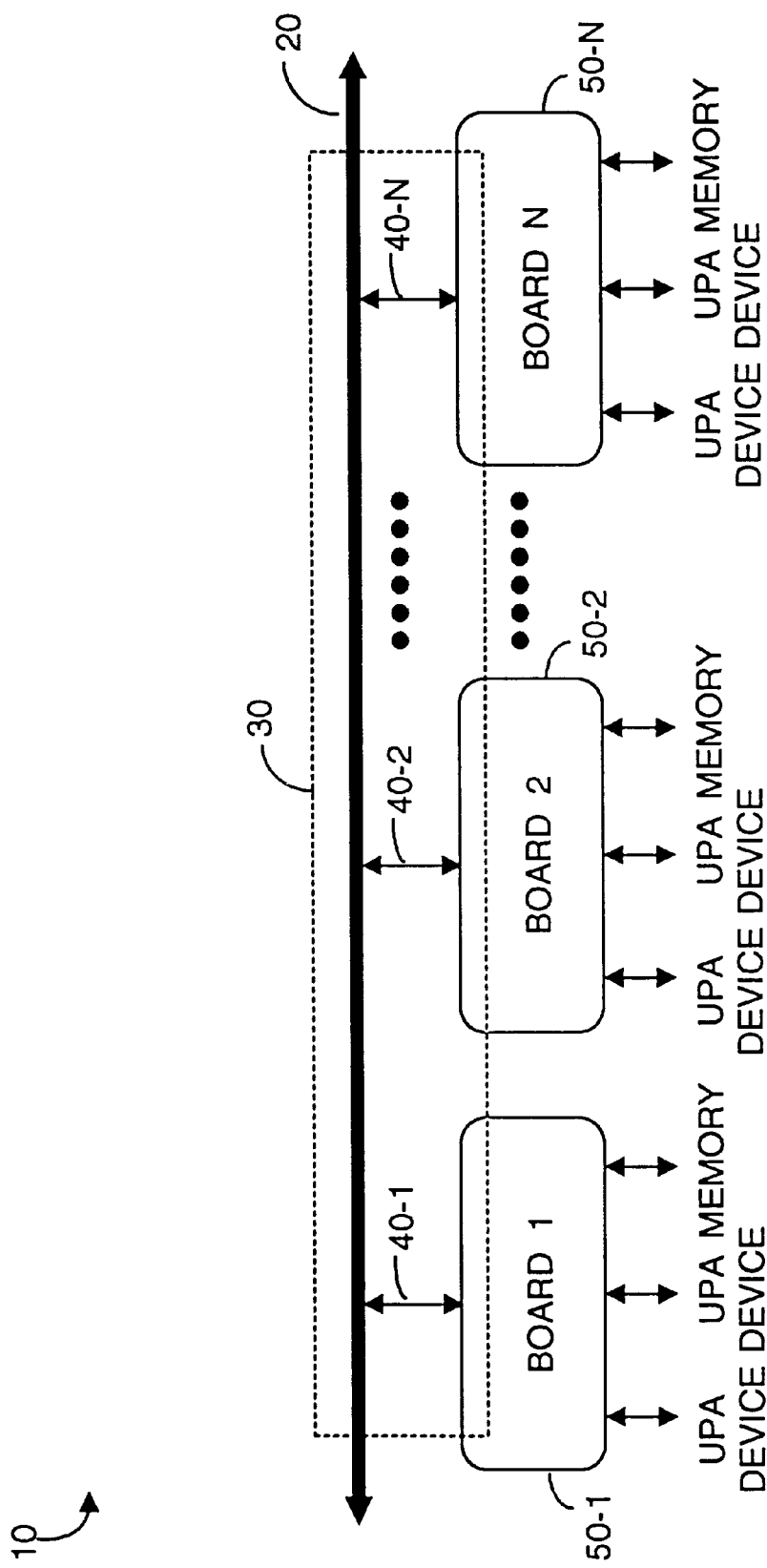
FIG. 1 depicts a computer system in which board-mounted devices interface to a shared bus system, according to a preferred embodiment with which the present invention is practiced.

FIG. 1 depicts an electronic system 10 according to the present invention that includes a shared bus system 20 comprising several buses (to be described) that is coupled by an interface architecture 30 via a plurality of lines, e.g., 40-N, to each of a plurality of preferably identical plug-in boards 50-N. In the preferred embodiment, system 10 is a computer workstation and interface 30 defines a split transaction snooping bus system with invalidation-based cache coherence among boards 50-N. However, a distributed arbitration mechanism according to the present invention may be practiced with other than such a bus system.

Circuit boards 50-N are interconnectable within system 10 by and physically plug into one of preferably sixteen identical plug-in board slots, preferably mounted eight on either side of a centerplane. Any of the slots may be filled by a plug-in circuit board containing multiple CPUs and associated RAM, or input/output ("I/O" or "IO") device that preferably includes two Sbuses. As described much later herein, boards 50-N may be plugged-in while system 10 is powered-up, or "hot". In the preferred embodiment, the centerplane clock rate is about 83.3 Mhz, and associated bus data bandwidth is about 2.67 GB/sec.

Each circuit board preferably includes one or two universal port architecture ("UPA") compatible CPU devices, e.g., devices having a specific interface, and a preferably random access memory ("RAM").

Figure 2:
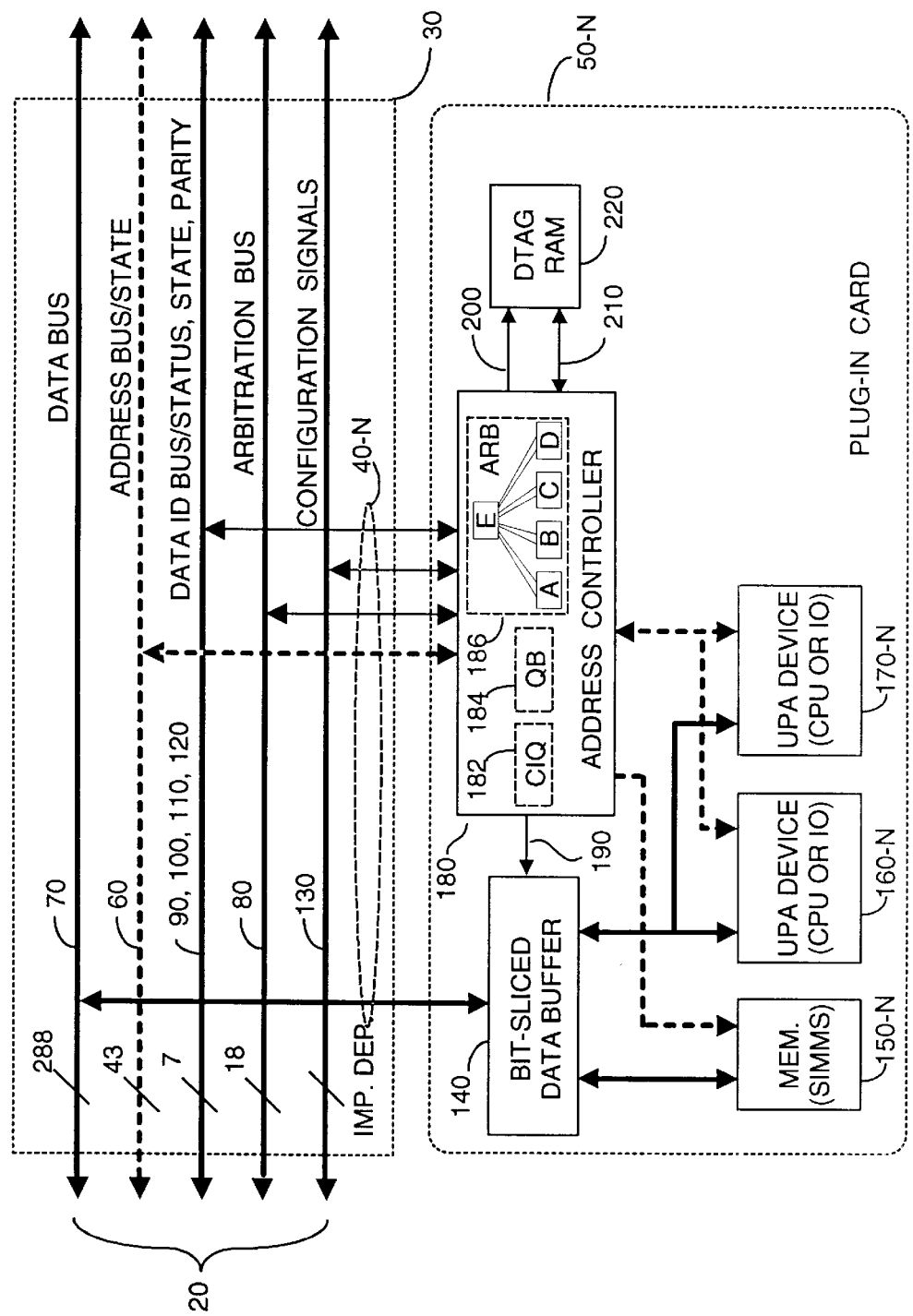
FIG. 2 is a detailed depiction of a plug-in circuit card as shown in FIG. 1.

FIG. 2 depicts bus system 20 and a typical plug-in circuit board 50-N in further detail. In FIG. 2, solid path lines denote data paths, and dashed path lines (e.g., from address controller 180 to Address Bus 60) denote address paths. A preferably distributed arbitration ("ARB") unit 186 within address controller 180 implements the present invention, arbitrating access to an associated Address Bus.

As shown in FIG. 2, each board 50-N includes a preferably bit-sliced data buffer-controller 140 that communicates (via a line in line-bundle 40-N) with data bus 70, as well as with on-board RAM 150-N, and UPA CPU devices 160-N and/or 170-N or I/O units. Data buffer-controller 140 preferably includes 8 bit-sliced integrated circuit ("IC") chips that buffer data during transfers between UPA ports, memory, and bus system 40.

Each board 50-N further include an address controller 180 that communicates (via lines in line-bundle 40-N) with all signals except DataBus signals, e.g., with Address Bus 60, with DataID Bus 90, with the Arbitration Bus 80 and with the configuration signals 130. Within address controller 180 are a coherent-in queue ("CIQ") 182, a queue buffer ("QB") 184, and a distributed arbitration mechanism ("ARB") 186, according to the present invention.

Address Controller 180 generates control signals that are carried over path 190 to the Data Controller 140. Signal timings on the DataBus 70, the AddressBus/State Bus 60, the Arbitration Bus 80, and the Data ID Bus 90 are designed to permit such multiplex-partitioning of data and address paths.

As shown in FIG. 2, Address Controller 180 also communicates with on-board RAM unit 150-N, and with each UPA CPU device 160-N, 170-N through appropriate address paths. Paths 200, 210 couple the Address Controller to a so-called Dtag RAM unit 220.

As noted, a "device" may denote an I/O unit that can cache lines of memory. A board containing main memory for a cache block or cache line is termed the "home" for the line. A coherently maintained memory space, including caches, is termed a coherent domain. By contrast, a non-coherent domain is a storage area that may hold copies of memory without maintaining coherence for the stored data, e.g., streaming buffers and so-called "bcopy" buffers.

In system 10 and interface 30, it is important to ensure correct cache-coherent behavior and memory ordering. So doing imposes requirements for signal timing and encodings for the various signals coupled from boards to the bus system, and also imposes system circuit board level requirements as well. Interface system 30 is concerned with inter-board coherence rather than inter-device coherence is ensured.

Figure 3:
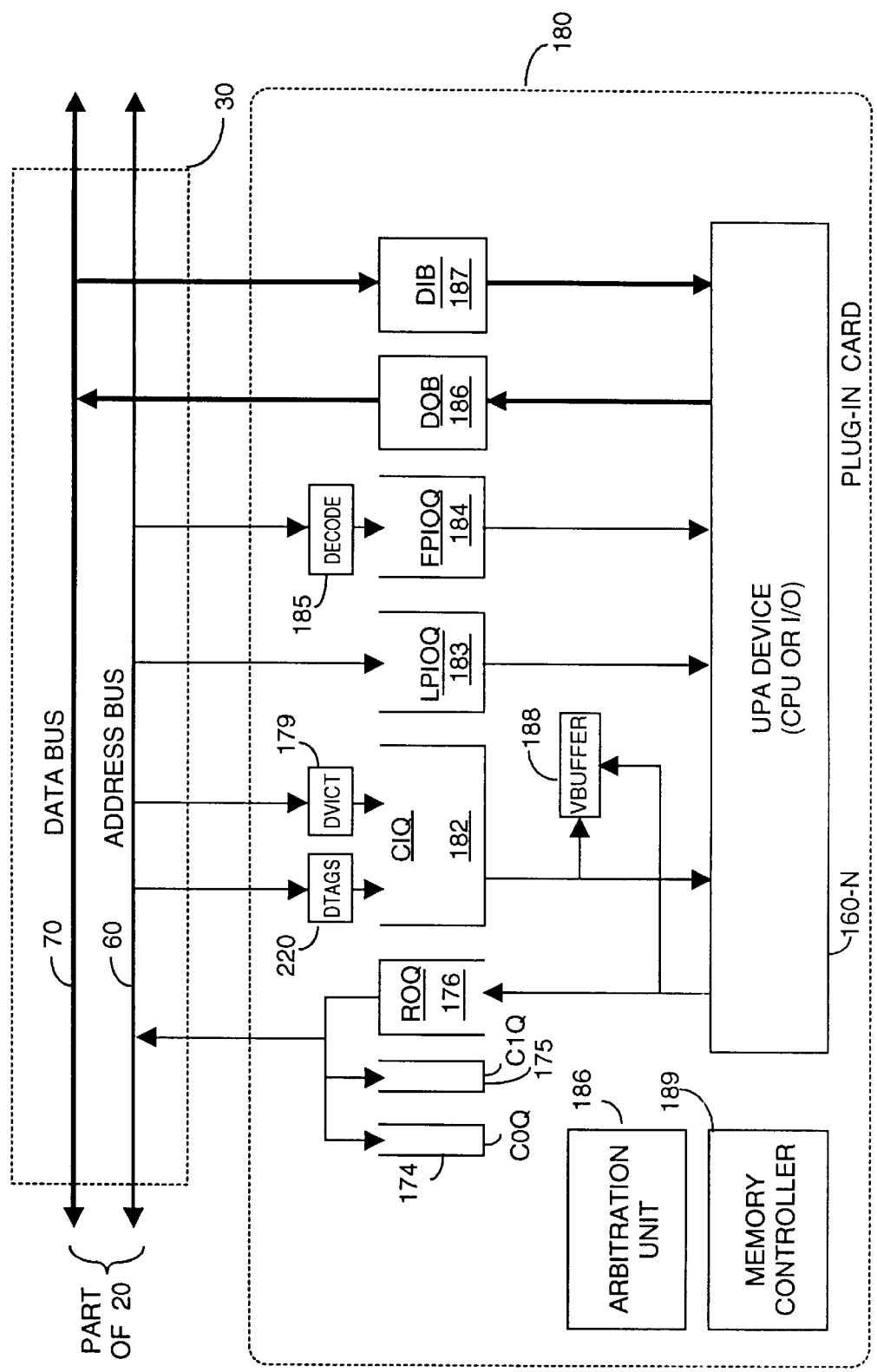
FIG. 3 is a detailed depiction of buffering within a circuit board address controller such as shown in FIG. 1.

FIG. 3 depicts an typical address controller 180 in further detail. All device requests are issued to Address Bus 60 in order as represented by a Request Out Queue ("ROQ") 176. Unlike the more generalized interface that permits responses to arrive out of order, when system 10 is used with UPA interface devices, the UPA interface imposes ordering restrictions. Requests are assigned a UPA class (0 or 1) and responses for requests in the same class must ne in order of the requests. However responses to requests in different classes may arrive in any order. Queues C0Q 174 and C1Q serve the function of ensuring that responses to UPA requests of the same class arrive in order.

All coherent requests and interrupts relevant to a device (including foreign coherent requests and its own coherent requests) are placed into a Coherent In Queue ("CIQ") 182 after being "filtered" by Dtags from DTAG RAM 220. A tag comparison between contents of address controller DTAG memory 220 ("device-level tags") and a bus-level RAM representation of tags enables filtering to rapidly identify, for example, a request seeking invalid data from a given memory address.

In the context of a device, a local request is one from the device itself, whereas a foreign requests is a request from another device directed to this device. All device input/output ("PIO") requests are placed into a Local PIO Queue ("LPIOQ") 183, and all foreign PIO requests to the device are placed in the Foreign PIO Queue ("FPIOQ") 184, as shown in FIG. 3. In general, transactions are processed in order, starting from the head of a queue.

Data going to and from device 160-N is buffered in two buffers (e.g., not queues) Data Out Buffer ("DOB") 186 and Data In Buffer ("DIB") 187, as shown in FIG. 3.

Address controller 180 also contains a Dtags buffer 220, a DVICT tag 179 used for snooping for a dirty victim, a DECODE unit 185, and a Vbuffer 188 that is used to optimize copyback and performance of cache misses with dirty victim. U.S. patent application Ser. No. 08/607,364 filed Feb. 26, 1996 entitled using a writeback buffer to improve copyback performance assigned to the assignee of the present invention discloses an embodiment of a Vbuffer and copyback optimization method with which the present invention may be practiced, although other buffers and methods may instead be used. As shown in FIG. 3, address controller 180 also includes an arbitration unit 186 and a memory controller 189.

Overview of Preferred Arbitration Mechanisms:

System 30 can support several methods of Address Bus arbitration to reduce arbitration latency including a so-called fast/slow arbitration, and a so-called bus parking arbitration. These two methods describe how the circuit boards behave once they have selected a winner. In selecting a winner from among several boards' requests, each of these methods preferably utilizes the same round-robin prioritized method, according to the present invention.

In the bus parking method, the previous winner is allowed to drive the bus immediately, whereas all other devices must arbitrate, preferably using round-robin, to become the next winner. In the fast/slow method, system 30 dynamically can switch modes. If the mode is fast, then any board can drive the Address Bus immediately along with its request, e.g., in the same clock cycle. But if there is a collision (e.g., two or more requests are asserted in fast mode), then the mode switches to slow, and the winner is determined using round robin. More specifically, if multiple boards drive the Address Bus simultaneously, the resultant collision is detected and the packet is discarded. In the next cycle, all boards check the request lines to ensure that no more than one board drove the Address Bus at the same time. If multiple boards drove the Address Bus simultaneously, the address is ignored, and arbitration switches to slow mode method. If there are no requests, then arbitration reverts to fast mode. In system 30, firmware preferably controls which arbitration method is used in a given system. Electrical restrictions imposed upon multiple simultaneous bus drivers suggest that the fast/slow arbitration method is best used for smaller systems having shorter centerplanes.

Fast/slow arbitration is disclosed in U.S. patent application Ser. No. 08/551,862 entitled A DUAL MODE ARBITRATION METHOD FOR COMPUTER SYSTEMS WITH ZERO TO TWO CYCLES OF LATENCY, assigned to the assignee of the within application, and filed on Nov. 7, 1995.

Arbitration requests are stateless, and the request line is driven on the Arbitration Bus until the requesting board wins arbitration. In fast mode the request is present with the address, whereas in slow mode the winning request is present on the Address Bus two cycles before the address.

The selection of fast and slow mode Address Bus arbitration may be described by the following algorithm. Let S represent a state variable indicating slow arbitration, let T represent the current clock cycle (e.g., the time that the new state is computed), and let T-1 represent the time at which the previous arbitration request cycle took place (e.g., two system clock cycles earlier).

At arbitration synchronization reset, set S=0;
If (S==0) and (at most one request was made at T-1)
then
    S=0:
else
    if (no requests were made at T-1) then
        S=0;
    else
        S=1.

Details of Prioritized Round-Robin Arbitration Mechanism:

The round-robin arbitration method ensures that one circuit board will always be a default winner. This winner may drive the Address Bus and will also drive its request line in the same cycle. All other boards can drive the Address Bus, only after winning arbitration. In any Address arbitration cycle, if there are requests from boards other than the default winner, a new default winner is chosen and can drive its Address Bus packet two cycles after making its initial request. If there are no requests from other boards, the default winner remains the same. Initially, the default winner is board 0.

Figure 4:
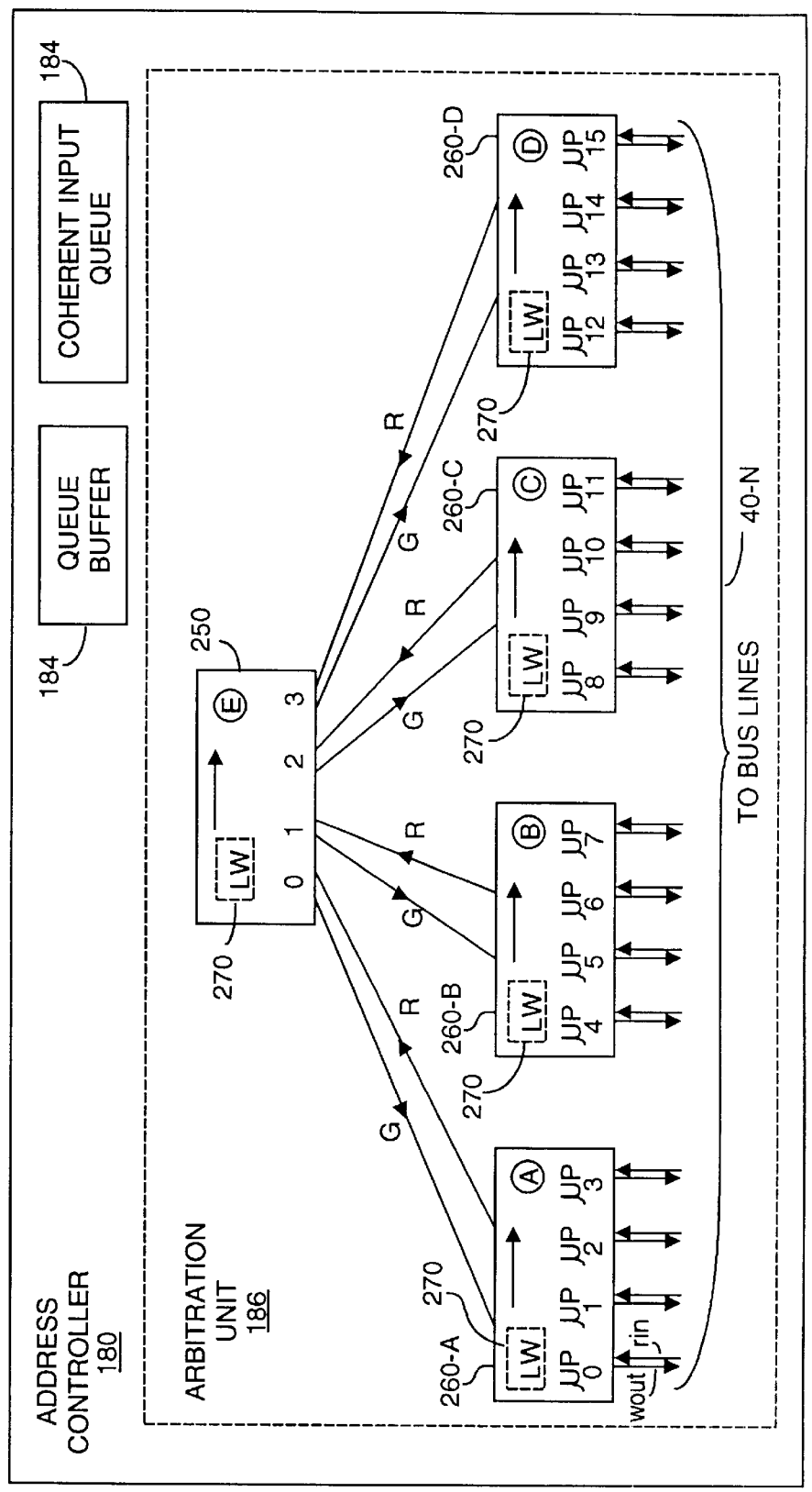
FIG. 4 is a detailed depiction of an address controller arbitration unit for the system of FIG. 1.
Figure 5:
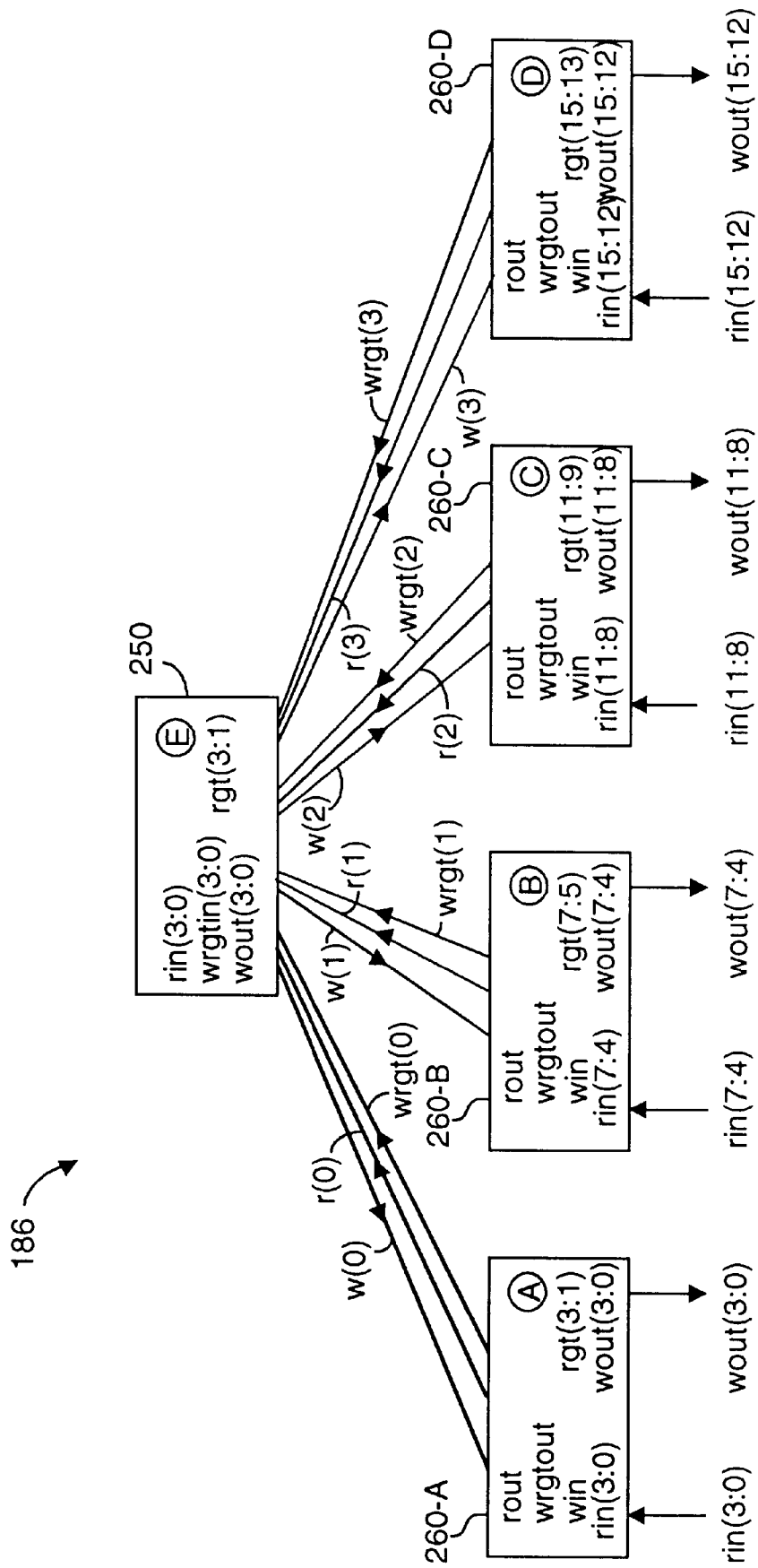
FIG. 5 is a logical depiction of a prioritized round-robin arbitration unit of FIG. 4.

FIG. 4 depicts a preferred implementation of address arbitration, according to the present invention, whose logical implementation is shown in FIG. 5. ATTACHMENT 1 herein is a machine code listing showing a generic, e.g., relatively hardware-independent, implementation of the herein-described prioritized round-robin arbitration. FIG. 4 is somewhat simplified in that each distributed arbitrator unit has sixteen inputs, one of which comes from the node associated with the unit, and a single winner output signal, the outer winner out signals being internal to the arbitration unit.

As shown in FIGS. 2 and 4, the prioritized round-robin arbitration mechanism preferably is distributed as ARB units 186 among address controllers 180 on each circuit board 50-N (see FIGS. 2 and 4). Each address controller sees the same information, e.g., requests made to it as well as up to 15 other requests that may exist. Further, each address controller is in the same state, and autonomously makes low, leaf-level, and top arbitration level access Grants.

As shown, Address Controller 186 on each circuit board includes logic implementing a two-level hierarchial arbitration ("ARB") unit 186 that communicates with the bus lines and with address controllers ("ACs") that can request access to the Address Bus. Each ARB unit 186 preferably includes four identical leaf arbitrators 260-A (or "A"), 260-B (or simply "B"), 260-C ("C") and 260-D ("D"), coupled to one top arbitrator 250 ("E") within the same address controller 180 on the same circuit board. Between the top arbitrator and each leaf arbitrator there is an upward directed request line ("rout"), an upward directed winner-to-the-right ("wrgt") line, and a downward directed grant line ("win").

As shown in FIGS. 4 and 5, each leaf arbitrator has four request in lines ("rin"), each such line being coupled to a single address controller serviced by that leaf arbitrator. As shown in FIG. 2, the Arbitration Bus preferably has 18 lines, 16 of which go four to each leaf arbitrator as "rin" lines. e.g., one such request input line being dedicated to each of 16 address controller units (see also FIG. 5). The remaining two Arbitration Bus lines are used to ensure proper Flow Control (e.g., a mechanism to halt Grants if the shared Arbitration Bus resource is temporarily unavailable) and provide phase information identifying whether the system presently is in an Address ("A") or Data ("D") cycle. Each Address Controller thus sees sixteen input request signals (rin) and will output sixteen winner out signals (wout).

As implemented in FIG. 4 and FIG. 5, arbitration is 16-way, comprising four leaf level 4-way arbitrators 260-A, 260-B, 260-C, 260-D, that each judge arbitration requests among up to four contending CPU devices. A fifth, top arbitrator 250 decides which of the four leaf arbitrators may now grant Address Bus access to a requester. Using this disclosed embodiment, the two-level hierarchal structure shown in FIG. 4 behaves functionally like a single large 16-way prioritized arbitrator.

Within an Address Controller 180, arbitration requests are presented to a circuit board-located leaf arbitrator using the rin lines. More specifically, two CPUs associated with the circuit board (e.g., 160-N, 170-N in FIG. 2) will arbitrate for access request using one on-card rin line, whereas fifteen requests will come from off-card CPUs via the Arbitration Bus and fifteen rin lines. The leaf-level arbitration winner will send its Address packet to a card-level bus, for queueing within queue buffer 184 in the Address Controller 180 for that card.

In FIG. 4, for example, leaf arbitrator A services requests to access the Address Bus from any of four CPUs, here denoted $\mu p0$, $\mu p1$, $\mu p2$, and $\mu p3$. As shown in FIG. 5, the CPU devices make their leaf arbitration requests via rin input lines, which are coupled to the Arbitration Bus. Requests from these devices are prioritized such that, using leaf arbitrator A for example, a request from μp0 or CPU0 has priority over a request from μp1 or CPU1, which has priority over a request from μp2 or CPU2, which has priority over a request from μp3 or CPU3.

It will be appreciated that each leaf arbitrator can function independently to determine a potential winner among its up-to-four requesters. Each leaf arbitrator selects a "potential" winner, and the ultimate winner is selected by the top arbitrator from among the competing leaf-level potential winners. Only the leaf arbitrator receiving a Grant from the top arbitrator will permit its "potential" winner to be the ultimate grant winner. As such, the top arbitrator Grant is used as a qualifier at the leaf level arbitrators. This method advantageously provides a fairly small latency to the 16-way arbitration method.

The above-described arbitration method is made round-robin by providing a last winner ("LW") pointer state at each leaf level and top arbitrator unit. The LW pointer records which requester associated with each arbitration unit was the last winner at that unit. Thus, as shown in FIG. 4, leaf arbitrators A, B, C, D and top arbitrator E each include an identical LW pointer mechanism that increments rightward (e.g., decrease in priority) with each arbitration grant at that level.

Each leaf arbitrator A, B, C, D arbitrates among contenders presented based upon priority of each contender and a last-winner ("LW") history of awards at that level. The top arbitrator E includes a LW pointer that points to the last winning leaf arbitrator. Top arbitrator E decides which of the leaf level winners shall win a grant of arbitration, based upon relative priority of the leaf arbitrators and upon a LW history of grant awards at the top arbitration level. The various LW pointers associated with each arbitration unit change state synchronously as needed.

Using the prioritized round-robin method, when multiple requests are present, a new default arbitration winner is selected. When a board wins an arbitration, the winning board will have the lowest priority in the next state.

For example, if CPU5 in leaf arbitrator B was the last device to win an arbitration grant at that level, then LW 270 points to CPU5. A next arbitration grant within leaf arbitrator B will go to CPU6 or CPU7, e.g., devices to the "right" of the last winner, unless of course neither CPU6 or CPU7 asserts a request, but CPU5 does. Thus, unless neither CPU6 nor CPU7 assert a request, CPU4 and CPU5 cannot be candidates for an access grant. If neither CPU6 nor CPU7 made a request, and CPU4 and CPU5 both made requests, in this example CPU4 would win at the leaf arbitration B level because it has higher priority than CPU5.

A CPU wanting to arbitrate for Address Bus access initiates a Request to top arbitrator 250 through its input request "rin" line to the leaf arbitrator to which it is coupled (see FIG. 5). Each local leaf arbitrator arbitrates among the zero to four Requests that may be present on its rin lines and decides the winner among its requestors. The decision is based upon the stored LW information and the priority of the contending requests and is made autonomously. Each Address Controller 180 on each circuit card 50-N sees the same information at all times as the Request information is coupled to all units 180 via Arbitration Bus 80, and each controller 180 will have the same state. As described more fully below with respect to ATTACHMENT 1, LW preferably is bit-masked implemented with three bits, namely rgt (for "right"), as follows:

| rin: | 0 | 1 | 2 | 3 |
|------|---|---|---|---|
| rgt: |   | 1 | 2 | 3 |

According to the present invention, if rgt[n] is set, arbitration line n will have a higher priority than arbitration line n-1. If rgt[1] is set, then rin[1] will have a higher priority than rin[0]. When a leaf level arbitrator has granted a winner, its request lines to the right will now have the highest priority. If any of these rin lines request access to the shared resource, the leaf level arbitrator asserts the winner-to-the-right signal wrgt to the top level arbitrator. This ensures this leaf arbitrator will one more be granted the shared resource.

Thus, in leaf arbitrator A, if CPU0 won last time, and CPU1 does not now request, but CPU2 and CPU3 are each requesting Address Bus access, then CPU2 wins because its priority exceeds that of CPU3. Each leaf arbitrator makes a similar decision among its contenders and outputs a signal on an "rout" line to the top arbitrator 250 indicating that it has a CPU wishing access. Each leaf arbitrator also sends to the top arbitrator a winner-to-the-right signal ("wrgt"). The leaf arbitrator asserting wrgt has the highest priority at the top arbitrator, and will be granted access to the bus.

From the perspective of top arbitrator 250, the leaf arbitrators are prioritized such that the first leaf arbitrator A has priority over the second leaf arbitrator B which has priority over the third leaf arbitrator C which has priority over the fourth leaf arbitrator E. It is irrelevant to the top arbitrator which CPU associated with a given leaf arbitrator might have "won" arbitration at the leaf arbitration level. The only needed information is which of the four leaf arbitrators presently have a device seeking access.

At the top arbitrator and at the leaf arbitrator levels, the LW pointer will override the strictly prioritized order. If a device requesting through leaf arbitrator A last won the top arbitrator-issued Grant, then leaf arbitrators to the "right" of the last winner A, e.g., B or C or D, will have a higher priority than A. However, if leaf arbitrator A asserts the wrgt signal it will get the highest priority. As is the case with the leaf arbitration level LW mechanisms, the LW pointer does not wrap-around, and LW pointers are synchronously reset once per system clock cycle, as needed. At power-on to system 10, and upon insertion of a circuit board, the LW pointers are reset to their default value. The LW state changes (e.g., increment right) preferably occur on each 12 ns clock cycle in a synchronous fashion. In the preferred implementation, an ArbSync signal (described elsewhere herein), is driven by only one board and provides the mechanism for inter-board synchronization of arbitration state machines.

The top arbitrator makes a Grant decision based upon the contents of its own LW state machine, and upon the priority of the incoming requests on the "rout" lines from the leaf arbitrators. The ultimate Grant decision is rapidly made and passed down to the leaf arbitrators using winner-out or "win" lines via the Arbitration Bus. For example, if CPU0 won leaf level arbitration last time, it now has lowest priority, and leaf arbitrator A will receive a grant for its CPU1 if it requests access. Within leaf arbitrator B, if CPU5 won last time, it now has lowest priority, and CPU6 can win now (if it requests). At the top arbitrator level, if leaf arbitrator A won a grant last time, it now has lowest priority, and in this example leaf arbitrator B wins, which is to say its CPU6 can win the arbitration grant.

The notation used in FIG. 5 and ATTACHMENT 1 will be described briefly. ATTACHMENT 1 is intended to be generic and largely device-independent, e.g., the given code is not dedicated to a specific family of logic gates having specific fan-in and fan-out requirements. Those skilled in the art will appreciate that other implementations of the described round-robin arbitration method may also be implemented. In ATTACHMENT 1, the notation "~" denotes a NOT or a logical complement, e.g., ~1=0, whereas a vertical line "|" denotes a logical OR. The nomenclature "reset_1", for example, denotes that the "reset" signal is active when low or "0". Notation such as the "request input line" notation rin(3:0) denotes that leaf arbitrator A can receive up to four input CPU requests on bits 3, 2, 1, and 0. A single leaf-level signal rout is coupled up to the top leaf arbitrator, r(0) being a request from leaf arbitrator A, r(1) from leaf arbitrator B, and so on. The single leaf arbitrator win grant received from the top arbitrator wout(3:0) use four bits, namely 3, 2, 1 and 0.

Beginning at the top of ATTACHMENT 1, page i, module "arbbig" describes the internal functionality of the top arbitrator, and signals are identified and declared as inputs or outputs and their signal bit widths are defined. The entry "reg [3:1 rgt", for example, defines a real Grant. At the second "assign" entry, "change" queries whether any leaf arbitrator is asserting its "rin" signal. At the last "assign" entry on page i, if there is a change, then the next_rgt[1] is assigned realw[0], if not, rgt[1] is not changed. At the top of page ii, the synchronous assignment at the next rgt value to rgt is made.

At the top of page ii, module "arbgrp" describes the internal functionality of a leaf arbitrator unit. On page ii, for example, the notation "wire win01=rin[0] & ~rgt[1]" denotes that 0 wins over 1 if rin[0] is asserted and the rgt[1] is not set. The "wout[0]" assign entry denotes, for example, that 0 wins if its request is asserted, this leaf arbitrator is the winner over its peers. The "next_rgt[1]" entry near the bottom of page ii denotes that if the rin has changed and 0 wins, set rgt[1].

In ATTACHMENT 1 beginning at the bottom of page ii, the module "arbtop" describes how the top arbitrator and four leaf arbitrators are connected. FIG. 5 is a graphical depiction of these connections, and of the arbtop module itself. Beginning at the bottom of page ii and continuing to page iii, the module "arbtop(clk, reset_1, rin, wout)" is directed to interconnecting a previously defined top arbitrator and in the preferred embodiment four of previously defined leaf arbitrators.

The arbgrp module in ATTACHMENT 1 will now be described in detail. Each leaf arbitrator inputs four rin signals, and outputs one rout signal to the top arbitrator if any of the rin signals is asserted. Each of rin[1], fin[2], and rin[3] has an associated rgt resister. A rgt register is asserted if any rin to the left was the winner the last time the change signal was asserted by the top arbitrator. An rin signal with its corresponding rgt bit set has a higher priority than an rin signal to the left (with a lower number), and its rin signal is cleared. Otherwise, arbitration is strictly prioritized such that rin[0]<rin[1]<rin[2]<rin[3]. In the preferred implementation, rin[0] has no associated rgt register, and relies solely on the pure prioritization scheme.

If a leaf arbitrator was the last winner, and now a second rin with its rgt bit set is the winner, the wrgtout signal is asserted to advise the top arbitrator that this leaf arbitrator should have highest priority. The winner among the four rin signals, wout[3:0] is asserted if the corresponding rin signal is asserted, and the top arbitrator asserts the win signal of this leaf arbitrator, and it is determined the none of the other three rin signals wins over this rin signal.

Each pair of rin signals has two "winner equations" defining the conditions under which one or other will win, there being a total of twelve such equations. To win, the rin signal must be asserted, and the rin with the lowest number wins if the other rin do not have their corresponding rgt register asserted.

With respect to the arbbig module, the top arbitrator module is similar to the leaf arbitrators, which have been described. The winner equations are the same, as are the next_rgt equations. For the top arbitrator, the wout equations also reflect that a leaf arbitrator asserting wrgt gets highest priority. As the top arbitrator calculates a potential winner regardless if any of the leaf arbitrators have requested the bus, realw requires the leaf arbitrator to have its rin asserted as well has having been selected as the winner. The presently implemented change signal is asserted if there is a request from any of the leaf arbitrators. If the change signal is asserted, all rgt registers get updated.

The described synchronous distributed algorithm may be used both to rapidly arbitrate access to the Address Bus and to the Data Bus, although low latency access is more critical to the former than to the latter in system 10 as described. An Address packet may be output simultaneously with arbitration for Address Bus access, thus saving two clock cycles relative to prior art schemes (see FIG. 8). This approach is substantially faster than prior art schemes in which arbitration first occurs, and then following a grant Address packets are placed on the Address Bus. Further, there is a pin count savings in that a common Arbitration bus is time-multiplexed for arbitrating Address Bus and Data Bus access, as opposed to prior art schemes in which separate Address Bus Arbitration and Data Bus Arbitration lines are provided. In the preferred embodiment, address bus and data bus request transactions are each two-cycles in length.

Further, the described algorithm behaves as through it were a flat round-robin implementation with a relatively shallow logic depth, here about six logic levels. By logic depth it is meant that in the described embodiment, relatively few logic gate operations must be considered between incoming Requests and an access Grant. It will be appreciated that a flat implementation could be used (e.g., 16 input lines to a single leaf arbitrator), or that more than two levels of hierarchy could be used. On balance, however, the two-level hierarchy in which leaf arbitration occurs among small groups of contenders (e.g., up to four contenders/group) and in which top arbitration occurs among small groups of contenders (again, four) is readily implemented with low latency. Further, although the preferred embodiment uses the hierarchical round-robin arbitration method to arbitrate for various requests for access to a computer bus, the method could be used in any environment where rapid arbitration among competing contenders for a limited resource is desired.

Overview of Preferably Used Signal Groups:

In system 30, preferably eight signal groups, including an Address Bus 60, a Data Bus 70, an Arbitration Bus 80, a DataID bus 90, a State Signals bus 100, Status Signals bus 110, Parity Bit signals bus 120 and Configuration Signals bus 130. In practice, some of these logical signal groups are time-multiplexed onto the same bus signal wires.

An ADDRESS BUS 60 is used to broadcast commands from a source circuit board device, and to broadcast preferably 41-bit addresses from a requesting board to all boards in system 10. A SourceID field in the Address Bus is used to uniquely tag each transaction. The term "transaction" refers to an Address Bus packet and its corresponding valid Data Bus packet. In system 30, protocol is substantially simplified by transferring ownership of cache lines on Address Bus packets, and not on Data Bus packets as is commonly practiced in the prior art. Thus, boards 50-N may own lines, even before they actually have data for the line.

System 30 preferably uses a two-cycle (as opposed to a one-cycle) Address packet to permit boards to snoop on all Address Bus transactions. Each snoop requires one cycle to read a tag and one cycle to write the tag, a total of two cycles. A two-cycle protocol is similarly used for Data Bus packets.

A DATA BUS 70 is used to transfer data between two boards, the Data Bus packets being permitted to occur in any order on the Data Bus without affecting the memory model observed by the devices. Data transfer may be read-type from responder to initiator, or may be write-type from initiator to responder. A board issuing (e.g., broadcasting) an Address Bus packet is called the "initiator" of the transaction. The board providing the requested data for a read-type transaction, or accepting the data for a write-type operation is called the "responder". A responder and an initiator may in fact be the same board.

As noted, a Data Bus packet is two cycles long, with no requirement for blank cycles between Data Bus packets. For each cycle, the Data Bus preferably carries 256 bits of data (plus error correction code ("ECC"). Thus, a Data Bus packet preferably carries 64 bytes of data.

An ARBITRATION BUS 80 is used to arbitrate for the Address Bus 60 and Data Bus 70, with alternate cycles being used for such arbitration. Thus successive cycles alternative between address ("A") and data ("D").

DATA ID BUS 90 carries the SourceID of the Address Bus packet that initiated the Data Bus packet and is used before any Data Bus transfer. Bus 90 is used to match Data Bus transfers with Address Bus packets to permit driving the appropriate data on the Data Bus, or to permit loading the data into an appropriate storage buffer.

STATE SIGNALS 100 are lines indicating the state of the line addressed by the Address Bus packet. These lines include SHARED, OWNED, MAPPED, and IGNORE signals and are set forth in Table 7 herein. As described herein, the IGNORE signal preferably is used to implement optimal global transaction ordering.

The STATUS SIGNALS 110 include two lines to indicate errors in transactions, valid ECC on the Data Bus, and cancellation of a response (Data Bus packet).

The PARITY BIT SIGNALS 120 are used to detect errors in the Arbitration Bus, state signals, status signals, and DataID Bus. (The Address Bus preferably is protected by its own parity lines, and the Data Bus carries ECC.)

The CONFIGURATION SIGNALS 130 comprise facilities such as clocks, reset, JTAG, and other implementation dependent signals, for example the Trigger and Engaged signals used for hot-plug circuit board insertion capability.

TABLE 1

Signal Groups Summary

| Signal Group | Number of Signals |
| --- | --- |
| Address Bus | 43 |
| Data Bus | 288 |
| Arbitration Bus | 18 |
| DataID Bus | 7 |
| Configuration | implementation-dependent |

AddressBus Signal Group Definitions: ADDRESS BUS 60 preferably consists of 43 signal wires including one parity signal. Table 2 shows Address Bus packet fields, an Address Bus packet being driven in two consecutive cycles.

TABLE 2

Address Bus Fields

| Signals Bits | Cycle 0 Field | Cycle 1 Field |
| --- | --- | --- |
| 42 | Parity1 | Parity0 |
| 41 | Reserved | Ignore (mux'd) |
| 40:25 | Address[40:25] | ByteMask |
| 24:18 | Address[24:18] | SourceID |
| 17:4 | Address[17:4] | Shared[15:2](mux'd) |
| 3:2 | Cmd[3:2] | Shared[1:0](mux'd) |
| 1 | Cmd[1] | Port |
| 0 | Cmd[0] | Victim |

The multiplexed Shared field and the Ignore field are not logically part of the Address Bus (although they share the same pins), and are not initiator-driven with the remainder of the Address Bus. However, all other fields are driven by the initiator. The parity bits are driven one cycle later than the Address Bus fields they protect. Thus, the Parity0 field protects the Address Bus fields driven in cycle 0, whereas the Parity1 field protects the Address Bus fields driven in cycle 1. Driving the parity field one cycle later provides time for computing parity. The Reserved field preferably is not driven by the initiator.

The Parity1 field does not protect the Shared or Ignore fields because they are not driven by the initiator. Instead, the Shared and Ignore fields are protected by the ParityD signal, described later herein.

As noted, because tag reading and writing take two cycles, each Address Bus packet requires two cycles to permit boards to snoop on all Address Bus transactions.

In a preferred embodiment, the Address field contains bits 40:4 of the physical address. Bits 3:0 are not required as all the information they contain is available from the ByteMask field. The ByteMask field is used to specify any number of 16 bytes for ReadIO and WriteIO transactions.

In Table 2, the victim bit is used in ReadToShare, ReadToShareAlways and ReadToOwn transactions to indicate that the cache miss associated with the transaction has a dirty victim. The victim bit may be used for Interrupt packets to encode a special interrupt source. This bit is not used in any other transaction, and is driven as a 0.

The port field indicates the device number within the board, and in systems having at most two devices per board, a one-bit port field suffices.

The parity bits encode even parity on the Address Bus fields as shown in Table 3. Parity is driven one cycle after the fields that they protect to allow sufficient time for parity computation.

TABLE 3

Parity Coverage for Address Bus

| Signals | Parity Field |
| --- | --- |
| Address[40:4],Cmd | Parity0 |
| ByteMask, SourceID,Victim,Port | Parity1 |

In Table 3, the SourceID field is used to uniquely tag an Address Bus packet. The responder will place the SourceID on the DataID bus to match the Address Bus and Data Bus packets. The SourceID field has two subfields. A BoardID [6:3] subfield identifies the board, and a TransactionID[2:0] subfield identifies the transaction within the board. A TransactionID of 0 is reserved for idle, which permits each board to have up to seven outstanding transactions. All outstanding transactions have unique SourceIDs, but the choice of TransactionID is implementation dependent.

Command Fields:

Table 4 depicts Command Field encodings, used in system 30.

TABLE 4

Command Field Encodings

| Cmd | Transaction | Mnemonic |
|---|---|---|
| 0000 | Idle | |
| 1100 | ReadToShare | RTS |
| 1101 | ReadToShareAlways | RTSA |
| 1110 | ReadToOwn | RTO |
| 1111 | ReadStream | RS |
| 1011 | ReadIO | RIO |
| 1010 | ReadBlockIO | RBIO |
| 0101 | WriteBack | WB |
| 0110 | ReadToShareFork | RTSF |
| 0111 | WriteStream | WS |
| 0011 | WriteIO | WIO |
| 0010 | WriteBlockIO | WBIO |
| 0001 | Interrupt | INT |
| 0100 | Admin | ADM |

DataBus Signal Group Definitions:

The signal group definitions for the Data Bus 90 will now be described in detail. Each Data Bus has fields as shown Table 5.

TABLE 5

Data Bus Fields

| Signal Bits | Field |
|---|---|
| 287:256 | ECC |
| 255:0 | Data |

Data preferably is protected by an independent SEC-DED-S4ED Error Correcting Code developed by Kaneda, although other forms of protection could instead be used. In the preferred embodiment, an 8-bit ECC field is associated with every 64-bit data field as specified in Table 6.

TABLE 6

Data Bus ECC Distribution

| Data Range | ECC Bits |
|---|---|
| Data [63:0] | ECC [263:256] |
| Data [127:64] | ECC [271:264] |
| Data [191:128] | ECC [279:272] |
| Data [255:192] | ECC [287:280] |

Data Bus packets are two cycles (64 bytes) long, with no requirement for idle cycles between adjacent Data Bus packets.

The data order on the Data Bus is determined for block transfers by Address[5], with a 32-byte-aligned data quantum containing the address preferably being provided first. If Address[5] is 0, the first data cycle will contain bytes 0 through 31, and the next data cycle will contain bytes 32 through 63. If Address[5] is 1, the first data cycle will contain bytes 32 through 63, and the next cycle will contain bytes 0 through 31.

For non-block transfers (ReadIO, WriteIO), the data is placed in bytes 0 through 16 of the first data cycle, and individual bytes are specified in the ByteMask field, described elsewhere herein. In each data cycle, the bytes are in order with the lowest numbered byte occupying the highest numbered bits.

DataID Bus Signal Group:

The signal groups for the DataID bus will now be described. The DataID Bus is 7 bits wide and is used to match Data Bus packets with earlier Address Bus packets. Since the DataID is driven only on alternate clock cyales, it can share signal pins in multiplex fashion with a number of other signals as shown in Table 2.

Table 7 shows the DataID Bus Fields used in the preferred embodiment.

TABLE 7

DataID Bus Fields

| Signal Bits | Cycle0 Field (mux'd sig's) | Cycle1 Field |
|---|---|---|
| 6 | ECC Valid (Status signal) | DataID[6] |
| 5 | DCESel(Status signal) | DataID[5] |
| 4 | DataCancel/Error (Status signal) | DataID[4] |
| 3 | Owned (State signal) | DataID[3] |
| 2 | Mapped (State signal) | DataID[2] |
| 1 | Parity A (Parity signal) | DataID[1] |
| 0 | Parity D (Parity signal) | DataID[0] |

Referring now to FIG. 4, it will be seen that DataID Bus 90 is driven five clock cycles before the first data ID is made available on the Data Bus 70. This five cycle latency is needed to provide sufficient time to drive the appropriate data.

Figure 6:
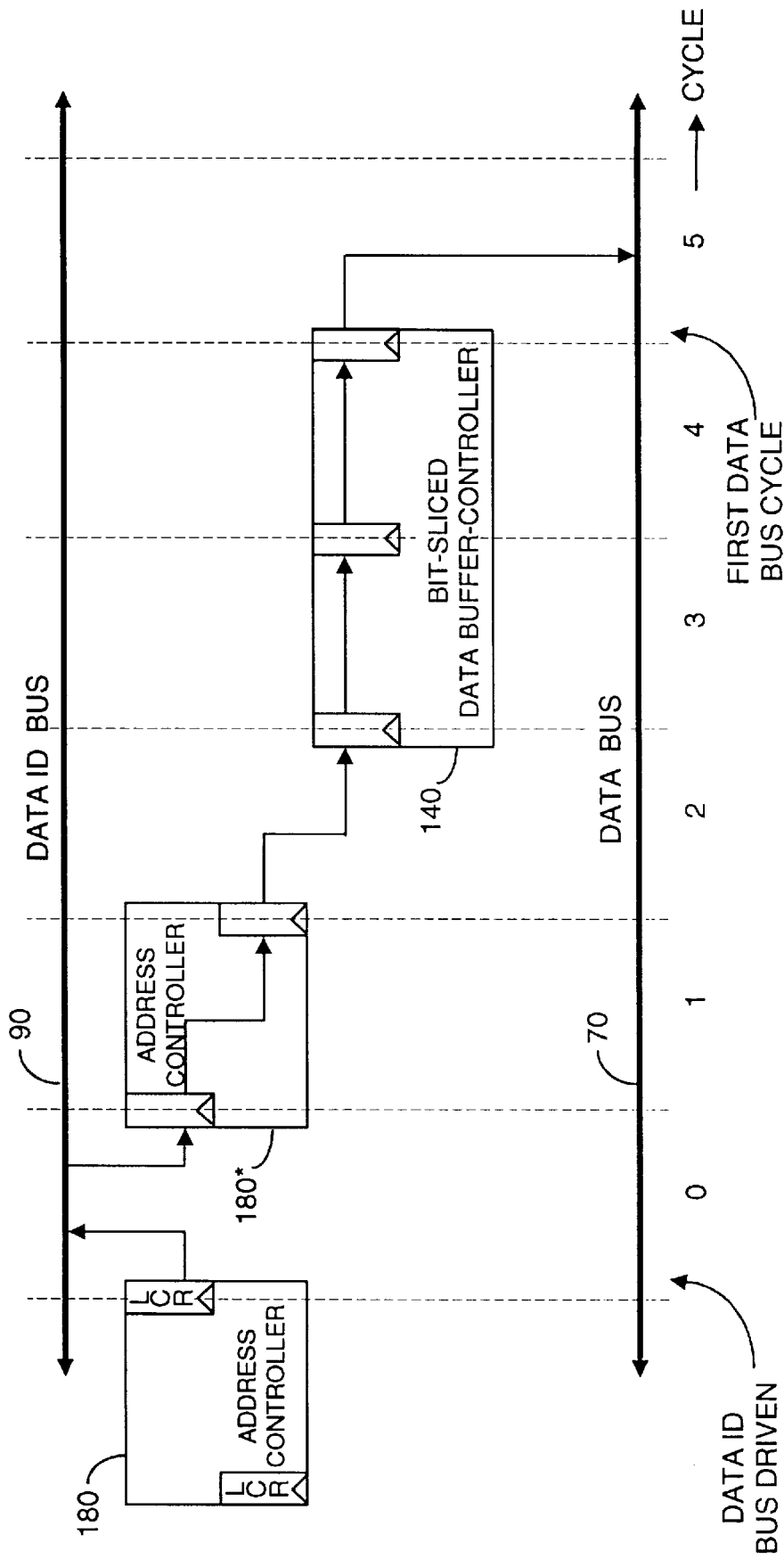
FIG. 6 depicts latency between driving the DataID Bus and driving the Data Bus for the system of FIG. 1.

In FIG. 6, each address controller 180 includes at least one latched clock register ("LCR"). The nomenclature "180\*" for the right-most address controller denotes that physically this address controller might be located on a circuit card 50-N other than the card containing the requesting or initiating CPU. In slot or clock cycle "0", the requestor that won DATA Bus arbitration (to be described) places its DATA ID on DATA ID bus 90, and in cycle "1" this information is coupled to address controller 180\*. In cycle 2, the output LCR associated with address controller 180\* couples the DATA ID to an input LCR associated with the bit-sliced data buffer-controller 140 on the requesting circuit card. Within unit 140 there is a two-cycle latency, and on clock cycle 5, the DATA ID is written to DATA Bus 70.

Separate arbitration for access to the DataID Bus is not required because the "winner" of the Data Bus arbitration is also the implicit winner of the arbitration for the DataID Bus.

ArbitrationBus Signal Group:

Plug-in circuit boards 50-N use Arbitration Bus 80 to gain access to the Address Bus 60 and Data Bus 90, with alternate address ("A") and data ("D") cycles on the Arbitration Bus being used for arbitration between the Address Bus and the Data Bus. Access to the DataID Bus and Status Signals is obtained implicitly along with the Data Bus. As shown by Table 8, the Arbitration Bus preferably consists of three fields.

TABLE 8

Arbitration Bus Fields

| Signal Bits | Field |
|---|---|
| 17 | ArbSync |
| 16 | FlowControl |
| 15:0 | Requests |

Request lines are allocated one per circuit board, and a distributed arbitration algorithm preferably is used for the arbitration. Each board seeking bus access asserts its Request line and reads all the other Request lines. Arbitration for Address Bus access is determined in a distributed manner within ARB unit 186 found in Address Controller 180 on each circuit board 50-N. The winner of an arbitration is determined one cycle after the requests are driven. The bus (Address Bus or Data Bus) can then be driven in the next cycle.

ARB unit 186 in the address controller 180 on each board causes all boards to execute an identical hierarchial round-robin type arbitration algorithm such that the states of each ARB unit 186 remain in synchronization with each other. The ArbSync signal, which is driven by only one (typically firmware-selected) board, provides a mechanism for boards to synchronize their arbitration state machines. ArbSync is driven to alternating 1 and 0 values indicating alternating Address and Data arbitration cycles, respectively. In a preferred embodiment, a board driving ArbSync may cause arbitration reset by driving the same value for two cycles. (ArbSync also useful for hardware debugging.)

Because Data Bus arbitration can begin before the data is available, arbitration latency can usually be overlapped. This permits Data Bus arbitration to use simple selection of a winner two cycles later.

The FlowControl field is used to halt Address Bus arbitration requests for certain types of transactions.

Flow Control:

The FlowControl signal will now be described. Flow-Control preferably is a wired-OR signal that can be driven by any number of boards to indicate their need to flow-control the Address Bus packets. Because of the electrical characteristics of a wire-OR line, FlowControl should be treated as an asynchronous signal.

Boards should not make requests for the Address Bus to initiate transactions other than Admin, ReadIO or WriteIO beginning two cycles after FlowControl is observed as asserted. Beginning two cycles after FlowControl is de-asserted, boards may make requests for the Address Bus to initiate any type of transaction. Flow control is unnecessary for Admin, ReadIO or WriteIO transactions. Flow control is also unnecessary for the Data Bus and should be ignored during the DataBus arbitration cycle. This is because for read type transfers, the initiator should always have space in its DIB 187, and for write type transfers the responder can always assert DataCancel should it lack space to accept the data.

Overview of Transactions According to the Preferred Embodiment:

Each transaction involves one broadcast Address Bus packet and one valid point-to-point Data Bus packet. As described later herein, there may be one invalid DataBus packet that is cancelled. It is the purpose of distributed ARB unit 186 to rapidly and with minimal latency arbitrate requests issued by any of the CPU devices on any of the plug-boards 50-N, and to rapidly issue a grant signal to the board-mounted device winning the arbitration.

Read-Type Transaction:

A typical read-type transaction occurs as follows:

(1) A CPU on the initiator board arbitrates for the Address Bus using the Arbitration Bus;

(2) The initiator drives the Address Bus with an address, a command, and a SourceID;

(3) All boards communicate with the Address Bus and "snoop" on the address. After a fixed delay following the address cycle, all boards drive State Signals indicating the state of the line at the time when the address was on the Address Bus. If necessary, the boards update their cache tags in their board mounted DTAG RAM unit 220 (see FIG. 2) at some later cycle for Address Bus packets, no tag update being caused by Data Bus packets;

(4) The responding board arbitrates for the Data Bus using the Arbitration Bus and distributed ARB unit 186. By distributed, it is meant that each address controller 180 on each plug-in circuit boards contains an ARB unit 186 whose state is identical to that of each other ARB unit;

(5) The responding board drives the DataID Bus with the SourceID from the Address Bus packet;

(6) The responding board drives the Status Signals;

(7) The responder drives the two Data Bus cycles;

(8) The data is loaded into the destination;

System 30 defines small set transactions that include read-type transactions (that result in data transfers from responder-to-initiator), and write-type transactions (that result in data transfers from initiator-to-responder). Collectively these transactions include ReadToShare, ReadToShareAlways, ReadToOwn, ReadStream, ReadIO and ReadBlockIO, WriteBack, WriteSteam, WriteIO and WriteBlockIO, Interrupt, ReadToShareFork, and Admin (a quasi-transaction). Preferred specific encodings for these transactions are shown in Table 3.

Read-Type Transaction Set:

The read-type transaction set includes (i) ReadToShare and ReadToShare Always Transactions, (ii) ReadToown transaction, (iii) the ReadStream transaction, and (iv) ReadIO and ReadBlockIO transactions. The actions required for each transaction by the initiator and responder, as well as the snooping operations required to be performed will now be described. It is noted that while minimum characteristics for the state machine exist, specific cache states and specific transitions need not be mandated. It is also noted that memory ordering and cache coherence depend on both the architecture of the system with which system 30 is used, as well as upon the specification for the device interface, e.g., a UPA-type interface specification.

(i) ReadToShare and ReadToShareAlways transactions

ReadToShare and ReadToSharAlways transactions are used to satisfy cache read misses in devices. The Read-ToShare transaction is initiated by a board when the board wants to cache a line that it may write to later. As regards snooping, the home memory for this address asserts Mapped. If Mapped is not asserted, the initiator will not expect a response and will return an error to the device. All boards snoop on the Address Bus packet and assert Shared if they have a cached copy of the line. A board that owns the line also asserts Owned and responds to the initiator. There can be at most one owner for the line. A board may assert Ignore if it wants to first issue another transaction. If the initiator has multiple devices, then the transaction could be initiated in response to a cache miss in one device while the line requested could be cached in another device in the same board. In that case the initiator asserts Shared. Similarly, if the line is owned by another device in the same board, the initiator asserts Owned, in which case the initiator and responder are the same board.

With respect to a responder, if a board owns the requested cache line it responds to the transaction. If no board owns the cache line, then the Home for the line responds. To minimize memory latency the memory may begin its response, including arbitrating for the Data Bus and driving the DataID Bus, before the Owned signal is valid. If the line is owned in another board, the memory cancels its Data Bus packet by asserting DataCancel. If Ignore is asserted and memory has already begun its response, then the responder cancels its Data Bus packet. Memory preferably does not issue the DataID for a speculative response that may be cancelled later than 11 cycles after the first cycle of the corresponding address bus packet. As regards cache states, if Shared is asserted, the initiator sets the state for the line to indicate that it is shared. If a board owns the line then it remains the owner for the line.

If no other board shares the line, the initiator may chose to become owner for the line, which represents a stronger condition than if the line were owned. This is useful because the first write to a cache line can be made more efficient, a procedure advantageously used in the UPA protocol. If this implementation procedure is used, the initiator does not know until after receipt of a Shared signal whether it will assume ownership of the line. But, if ownership is assumed, the initiator does so retroactive to the time its Address Bus packet was on the Address Bus. This is possible, however, in that the initiator need only assert the Owned signal after the Owned signal for its own transaction, by which time it knows whether it will be the owner. If Ignore is asserted, the state of the line does not change.

The ReadToShareAlways transaction may be substantially identical to the ReadToShare transaction, from the perspective of system 30. The initiator issues ReadToShareAlways when it wants to cache a line that it does not intend to write. It is recommended that the initiator not become the owner for the line, even if no other board asserts Shared.

(ii) The ReadToOwn transaction

The ReadToOwn transaction is used to satisfy cache write misses. A board that assumes responsibility for providing a line from its cache to other boards is said to be an "owner". A board requests ownership by initiating a ReadToOwn transaction to become an owner. The ReadToOwn transaction is initiated by a board wanting exclusive ownership of the cache line so that it may write to it. The same transaction is used regardless of whether the initiator has a valid cached copy of the line.

With respect to snooping and the ReadToOwn transaction, the board that has memory corresponding to this address asserts Mapped. Otherwise, if Mapped is not asserted, the initiator will not expect a response and will return an error to the device. All boards snoops on the Address Bus packet, and a board owning the line asserts Owned and will respond to the initiator. There can be at most one owner for the line. If the initiator already has a valid copy of the line, it may not need the data but uses the ReadToOwn transaction to obtain exclusive ownership of the line. In this case, the initiator may also assert Shared to inhibit the response from another cache or Memory that may own the line.

If a board owns the requested cache line and it asserts the Owned line, the board responds to the ReadToOwn transaction. If Owned is not asserted, then the memory for the line responds. To minimize memory latency, the memory may begin its response, including arbitrating for the Data Bus and driving the DataID Bus, before the Owned signal is valid. The memory cancels its Data Bus packet by asserting DataCancel if Owned is asserted. If Ignore is asserted and memory has already begun its response, then the responder cancels its Data Bus packet. As noted, memory should not issue the DataID for a speculative response that may be cancelled later than 11 cycles after the first cycle of the corresponding address bus packet.

As respects Cache States and the ReadToOwn transaction, the initiator assumes ownership of the cache line immediately after the its Address Bus packet appears on the Address Bus. All boards other than the initiator board invalidate their copies of that cache line. The cache line owner (if there is one and it is not the initiator) also invalidates its copies of the line and responds to the initiator, and the data packet from the responder becomes the exclusive copy of the cache.

If the initiator has multiple devices, the initiator invalidates the copy of the cache line in all devices other than the device on whose behalf the ReadToOwn transaction was initiated. The device on whose behalf the transaction was initiated should be given data from the responder as the exclusive copy of the cache line. If Ignore is asserted, the state of the line does not change.

Ownership is determined upon requesting a line and not upon receipt of the data for the line, and thus an owner may not yet actually have the line in its own cache. There can be at most but one owner at any given time for a line. This coherence protocol differs from most prior art coherence protocols in distinguishing the "owner" and a "writer". The term "writer" refers to a board having a potentially dirty copy of the line. The writer need not be the owner because ownership transfers as soon as another board requests ownership. As such, the writer may continue to write to the line until it supplies the line to another board. There can be at most one writer for a line at any time.

(iii) The ReadStream transaction

The ReadStream transaction is used to read a block of data from memory into a non-coherent domain such as bcopy or streaming buffers. As used herein, the term "block" or "line" denotes 64-byte aligned data that is usually associated with a cache block. The ReadStream transaction is initiated by a board when the board wants to read a line from the coherent domain into non-coherent domain. As respects snooping, the board that has memory corresponding to this address asserts Mapped, otherwise the initiator will not expect a response and will return an error to the device. All boards snoop on the Address Bus packet. A board that owns the line asserts Owned and responds to the initiator, there being at most one owner for the line. A board may assert Ignore if it wants to first issue another transaction.

With respect to a responder, if a board owns the requested cache line it responds to the ReadStream transaction, and if no board owns the cache line, then the home for the line responds. To minimize memory latency, the home may begin its response (including arbitrating for the Data Bus and driving the DataID Bus) before the Owned signal is valid. If the line is owned in another board, the home cancels its Data Bus packet by asserting DataCancel. If Ignore is asserted and memory has already begun its response, then the responder cancels its Data Bus packet. Memory should not issue the DataID for a speculative response that may be cancelled later than 11 cycles after the first cycle of the corresponding address bus packet. The ReadStream transaction does not cause any change in cache line states.

(iv) ReadIO and ReadBlockIO

ReadIO and ReadBlock IO transactions are used to read from input/output ("IO" or "I/O") space. The ReadIO transaction is used for byte, halfword, word, doubleword, quadword, and byte-masked reads, whereas the ReadBlockIO is used to read 64-byte blocks. A board initiates these transactions when it wants to read from IO space. The ReadBlockIO transaction is used to read a preferably 64-byte block, and ReadIO is used to read any combination of preferably 16 bytes indicated by the ByteMask from the 16-byte-aligned address range specified in the Address Field.

No snooping is required for the ReadIO and ReadBlockIO transactions but all boards will decode the address to determine whether they should respond. At most one board may respond, and a board intending to respond will assert Mapped. If Mapped is not asserted, the initiator will not expect a response and will return an error to the device. Ignore cannot be asserted for the ReadIO and ReadBlockIO transactions. As respects these two transactions, a board that contains the requested IO address becomes the responder. These transactions do not cause any change in cache line states.

Write-Type Transaction:

The write-type transaction set includes (v) WriteBack, (vi) WriteStream, (vii) WriteIO and WriteBlockIO, (viii) Interrupt, (ix) ReadToShareFork, and (x) Admin. These transaction types will now be described in detail.

(v) WriteBack

The Write Back transaction is used to write back a dirty victim to memory. WriteBack transactions are block-aligned and are initiated by a board when it wants to store a dirty line to memory. With regard to snooping, the home memory for the address asserts Mapped. The initiator snoops on the packet and asserts Owned if the line is not owned, which indicates that the line was invalidated by an earlier transaction and the WriteBack is cancelled. A board may assert Ignore if it wants to first issue another transaction.

With respect to the responder, the home for the requested memory address becomes the responder. Like all write-type operations, data is first "pushed" by the initiator. If the responder cannot accept the data it asserts DataCancel. The responder then assumes responsibility for "pulling" the data. This implies that the responder keeps track of write-type operations that it will "pull". The initiator should be ready to respond with the data when the initiator drives the Data Bus with the appropriate DataID to "pull" the data. If the initiator asserts Owned for the Writeback, the full write-type data transfer occurs, but the data is not written to memory. If Ignore is asserted, no data packets are issued. As respects cache states, the initiator relinquishes ownership for the line when the Address Packet for the WriteBack transaction is issued. This transaction should not be initiated (or should be cancelled by the initiator by asserting Owned) if another board initiates a ReadToOwn or WriteStream transaction first. In such case, the initiator will cancel the WriteBack transaction by asserting Owned.

Once the WriteBack Address Bus packet is issued, the memory for the line is responsible for responding to subsequent requests for the line until another board becomes owner. This responsibility exists, even if the Data Bus packet has not yet been received by the memory. Accordingly, the home tracks outstanding WriteBack transactions and delays responses for lines with outstanding WriteBack transactions. This is done because the Home will respond with the data from the WriteBack, rather than respond with its own stale copy of the data. If Ignore is asserted, the state of the line does not change.

As used herein, a "victim" is a cache line that is identified for replacement by new data to be written. The data in the victim cache line is "clean" if main memory already contains the data, and is "dirty" if the cache line (but not the main memory) has been updated, in which case a write back is needed to update the main memory.

(vi) WriteStream

The WriteStream transaction is used to write new data to a block of memory from a noncoherent domain such as bcopy buffers or streaming IO buffers. The WriteStream transaction is initiated by a board when it wants to write new data to a line of memory from a non-coherent domain, such as bcopy buffers or streaming IO buffers. All boards snoop on the Address Bus packet, and if a board (including the initiator) has a copy of the line, it will invalidate its copy. Shared or Owned signals should not be asserted, and the board having memory corresponding to this address asserts Mapped. A board may assert Ignore if it wants to first issue another transaction.

The home for the requested memory address becomes the responder. The initiator will first try to "push" the data to the responder by arbitrating for the Data bus and driving the data. If unready to accept the data, the responder asserts DataCancel. However, the responder will then "pull" the data by arbitrating the Data Bus and driving the appropriate DataID. This implies that the responder tracks write-type operations that it will "pull". The initiator should be ready to respond with the data when the initiator drives the Data Bus with the appropriate DataID to "pull" the data. If Ignore is asserted, no data packets are issued. All boards should invalidate their copies of the cache line. If Ignore is asserted, the state of the line does not change.

(vii) WriteIO and WriteBlockIO

WriteIO and WriteBlockIO transactions are used to store data to input/output space. A board initiates WriteIO and WriteBlockIO when it wants to write data to input/output space. The WriteBlockIO transaction preferably is used to write a 64-byte block. The WriteIO transaction is used to write any combination of 16 bytes indicated by the Byte-Mask from the 16-byte-aligned address range specified in the Address Field. No snooping is required for these transactions but all boards will decode the address to determine whether they are to respond. At most one board may respond, and if a board intends to respond it asserts Mapped. Ignore should not be asserted for these transactions.

The board that contains the requested IO address becomes the responder. The initiator first tries to "push" the data to the responder by arbitrating for the Data bus and driving the data. If the responder is not ready to accept the data, it asserts DataCancel and then "pulls" the data by arbitrating the Data Bus and driving the appropriate DataID. This implies that the responder will track write-type operations that it will "pull". The initiator preferably is ready to respond with the data when the initiator drives the Data Bus with the appropriate DataID to "pull" the data. These transactions do not cause any change in cache line states.

(viii) Interrupt

The Interrupt transaction is a write-type transaction for which the Data Bus packet is used to write a so-called "mondo vector" associated with the interrupt to the destination. The DataBus packet contains the interrupt vector information. The Interrupt transaction is initiated by a board when it wants to send an interrupt vector to another board. The interrupt target is specified in the address field and is implementation-dependent. In the preferred embodiment, the interrupt target ID is carried on the same address bits as specified in UPA, namely PA<18:14>.

No snooping is required for the Interrupt transaction, but all boards decode the address to determine whether they are to respond. A board that is the intended destination of the interrupt asserts Mapped. If the destination of the interrupt cannot accept the interrupt, it asserts the Shared signal, and the transaction is cancelled. A board may assert Ignore if it wants to first issue another transaction. The board that is addressed by the Address Bus packet becomes the responder unless it asserted the Shared signal to indicate that the interrupt was not accepted. The initiator will first try to "push" the data to the responder by arbitrating for the Data bus and driving the data. If the responder is not ready to accept the data, it will assert DataCancel. However, the responder then "pulls" the data by arbitrating the Data Bus and driving the appropriate DataID. Thus, the responder will track write-type operations that it will "pull". The initiator should be ready to respond with the data when the initiator drives the Data Bus with the appropriate DataID to "pull" the data. If Ignore is asserted, no data packets are issued. If Ignore is not asserted but Shared is asserted, then the initiator will not issue the "push" data packet unless the Victim bit is set in which case it will push the data packet. No board should assert DataCancel for this packet and the data can simply be dropped. The Interrupt transaction does not cause any change in cache line states.

(ix) ReadToShareFork

The ReadToShareFork transaction is not found in the prior art and helps implement the present invention. Further, this transaction is useful with a network configuration in which several bus systems 20 are present, each bus system having its own interface unit 30, circuit boards 50, and associated elements. This transaction is used to support distributed shared memory ("DSM"), and is treated as a WriteBack transaction by memory and as a ReadToShareAlways transaction by other devices. The initiator for the ReadToShareFork transaction is logically the initiator of the original ReadToShare or ReadToShareAlways transaction for which Ignore was asserted. However, this transaction is issued by the device that asserted Ignore. The initiator of the original transaction treats this as a ReadToShare transaction, whereas the Home treats this as a WriteBack transaction. The transaction will use the same transactionID as the original ReadToShare or ReadToShareAlways transaction.

The ReadToShareFork transaction is snooped like a ReadToShare transaction. A device having a shared copy of the cache line may also assert Shared. The response for the ReadToShareFork transaction is issued by the device that issued the transaction, e.g., the device that asserted Ignore. If the memory cannot accept the data, it will assert DataCancel and later pull the data. The initiator of the original transaction will take the data from the first data packet (if home did not assert DataCancel), or from the second data packet (if the home asserted DataCancel). Cache state changes are the same as that of the ReadToShare transaction.

In practice, the ReadToShareFork cooperates with the Ignore signal to implement the present invention. As noted, a requester CPU may not have its request granted immediately, but continues to process other tasks (as opposed to halting). Thus, the requester may have attempted to read data from a memory address holding invalid data, which transaction cannot be loaded into the associated coherent-input-queue because Ignore has been asserted. Assume that eventually such a write transaction updates the memory location with valid data, whereupon the original transaction is reissued over the bus system (e.g., read from the same specific memory location) using the same sourceID.

Writing to a memory location is relatively time consuming, e.g., taking perhaps 10 clock cycles. In the prior art, valid data might be written to the specific memory location after which the requester wishing to read the data would be permitted to do so. However obtaining the data and storing it locally would take yet another 10 cycles of so.

According to the present invention, the ReadToShareFork can simultaneously (a) write valid data to a requested memory location containing invalid data, and (b) return the valid data to the requester whose request for the data is still outstanding. Thus, rather than completing the outstanding request in approximately twenty clock cycles, the request is granted within about ten clock cycles at the same time that the data is updated in the relevant requested memory location. Note that from the standpoint of a memory controller, the ReadToShareFork appears to implement a write transaction. However, from the standpoint of an address controller, the ReadToShareFork appears to be implementing a read transaction.

Figure 8:
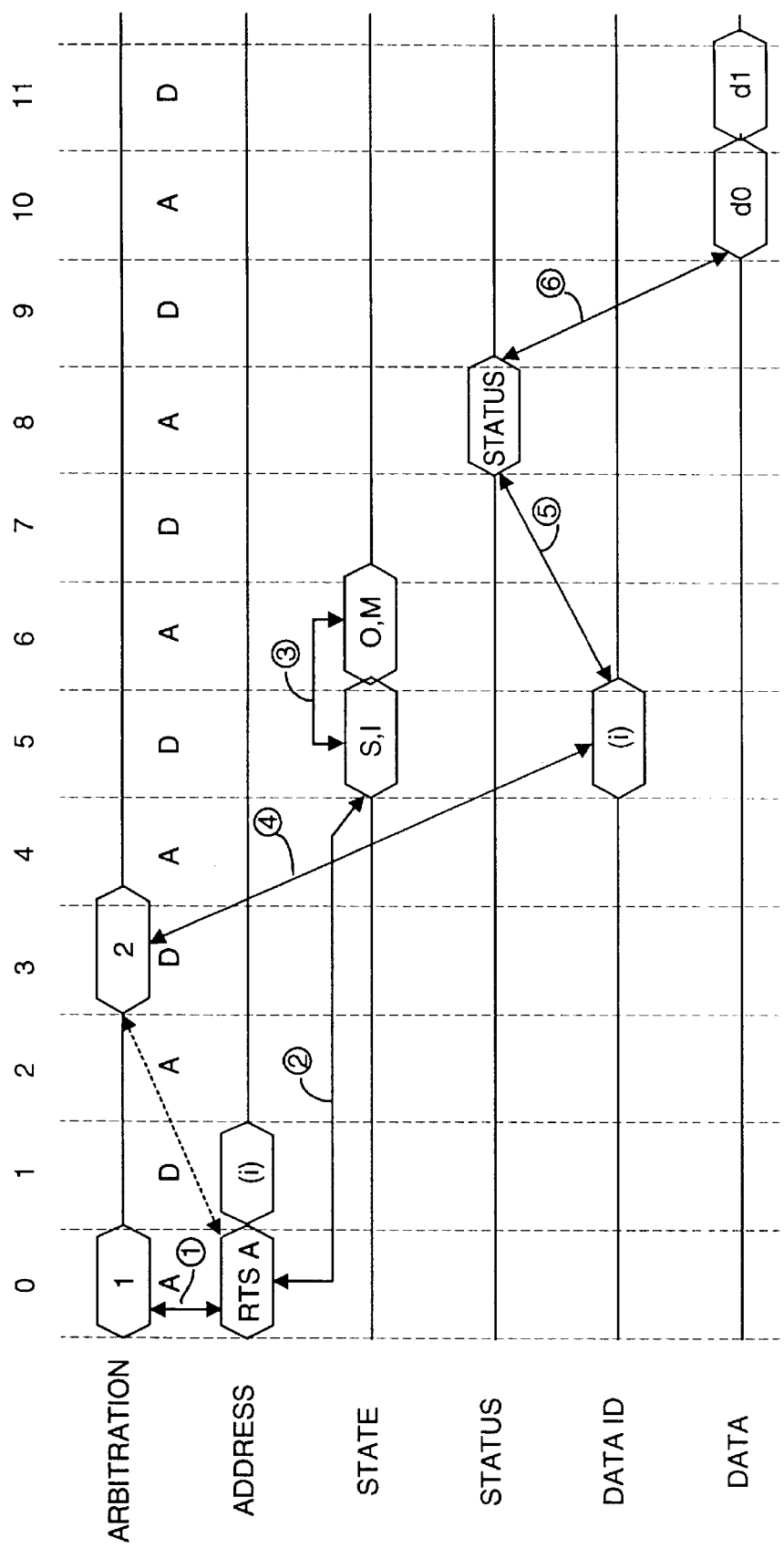
FIG. 8 depicts signal timing associated with fast mode arbitration, according to the present invention.
Figure 9:
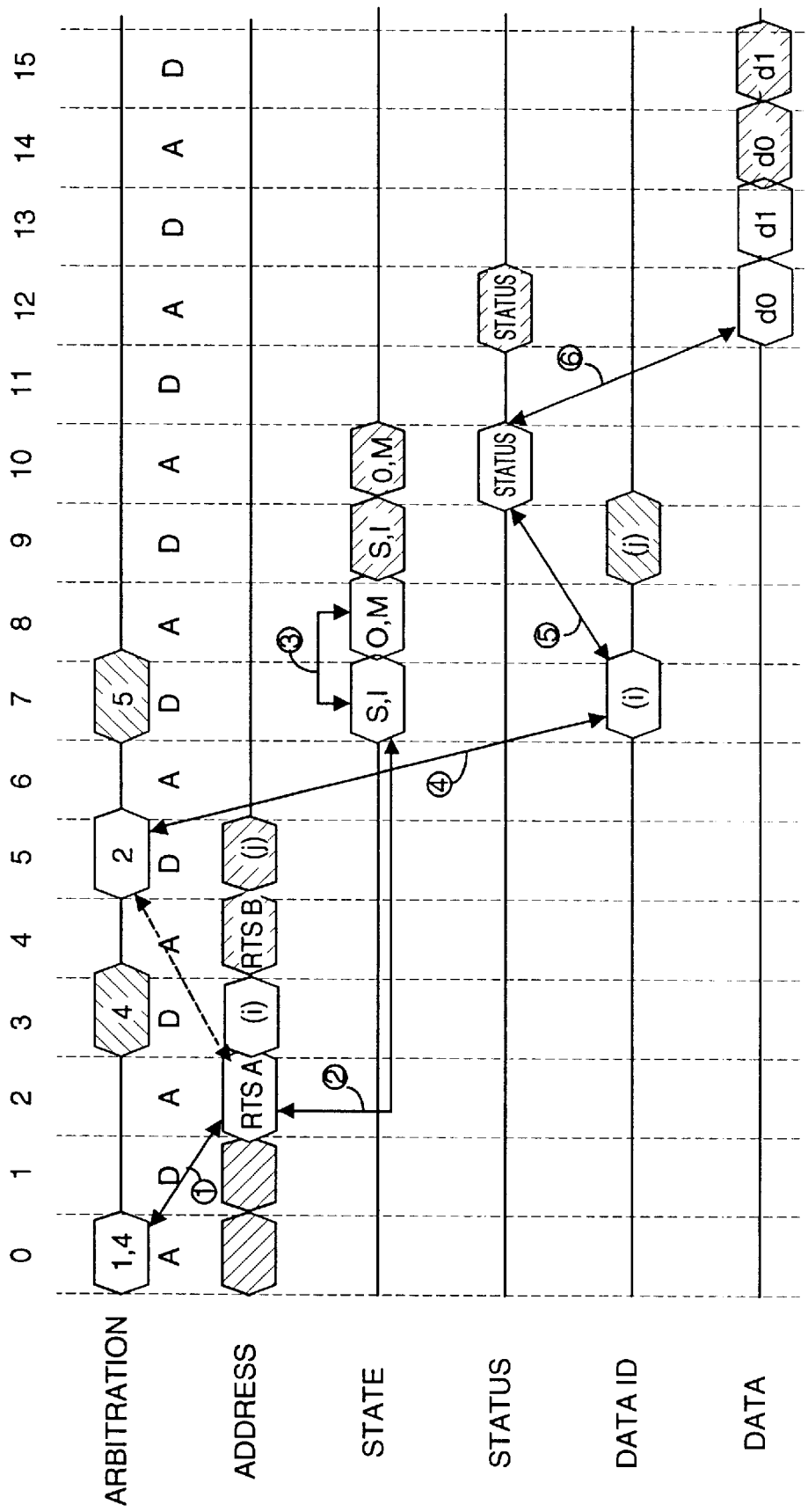
FIG. 9 depicts signal timing associated with fast mode arbitration in the presence of a collision.

With reference to FIGS. 8 and 9, note at slot 0 that the present invention can simultaneously arbitrate for address bus access and issue a ReadToShareFork transaction (abbreviated "RTS"). In time slot or time cycle 1, the interface unit sends a SourceID that is identical to the SourceID used previously in association with a transaction that was subjected to an Ignore signal. As early as three clock cycles from when the Address Bus transaction was sent, the interface unit can arbitrate for the data bus to send valid data values associated with the ReadToShareFork transaction. Thus, in FIG. 8 at slot 5, the DataID is sent, which will be identical to the SourceID.

At time slot 8 in FIG. 8, buffer memory optionally can issue a Status signal halting its receipt of still further data, e.g., if it is too close to storage congestion. (Later in time the Status-initiating memory unit can arbitrate for the Data bus when the congestion condition clears, and will send the original DataID.) If a halting Status signal is not issued, data (d0) appears on the data bus beginning at time slot 10. Since the present invention preferably uses two-cycles for data, the data continues into time slot 11 (d1).

From the perspective of memory, the data on the data bus at time slots 10, 11 are treated as write data. However, from the perspective of the requesting processor's address controller, such data is regarded as read data. This dichotomy, or "fork", enables the same data to simultaneously be sent to two separate destination locations, the proper memory address whereat an invalid version of the data has existed, and to the requesting CPU. The data recipient essentially neither knows nor cares from where the data having the desired DataID-SourceID match is coming.

Thus, the ReadToShareFork implements a mechanism by which a singe data source coupled to the bus system can simultaneously update a memory location with valid data and also satisfy a read request. This simultaneous procedure is implemented by the expedient of putting onto the Address bus a duplicate of the original request or request ID, whereupon the original requester can subsequently pull the now valid data. This procedure can be implemented with other than the Ignore signal mechanism. Further, an address controller could be caused to immediately have a ReadToShareFork placed on the bus. This procedure might arise if the address controller knew that memory update was necessary and wished to attain an earlier response in the system-wide sequence of transaction orders.

(x) Admin Function:

Admin is not strictly a transaction because it involves only an Address Bus packet, but no response Data Bus packet. Because no data is expected, a SourceID of 0 will be used. Admin is used for special administrative synchronization among boards. Admin Address Bus packets are handled differently from all other packets. These packets are not placed in any queues and their processing is implementation dependent. Ignore should not be asserted for Admin packets. Table 9, below, shows the address field in the Admin Address Bus packet encoding Admin type.

TABLE 9

| Admin Encodings | |
|---|---|
| Address Field | Admin Type |
| 1 | XIR |
| 2 | Wakeup |

In Table 9, the XIR Admin type is used to broadcast an XIR interrupt to all boards. The XIR interrupt provides a mechanism to interrupt CPUs for operating system debugging. The Wakeup Admin type is used to broadcast a Wakeup event to all boards, an event that is used in active power management to synchronize wakeup of powered down devices.

Preferably Used State Signal Types:

The four state signal types, Shared, Owned, Mapped, and Ignore, will now be described in further detail with respect to Table 10.

TABLE 10

Meaning of Shared and Owned Signals

| Cmd | Shared | Owned |
|---|---|---|
| RTS<br>RTSA<br>RTSF | Assert if valid. Used to mark the block shared | Assert if owned. If owned, memory will not respond, or will cancel its response |
| RTO | Only initiator asserts if block is valid in the initiator. If Shared asserted, memory will not respond, or will cancel its response. If shared is asserted, a cache that owns the line will not respond either[1] | Assert if owned. If asserted, memory will not respond, or will cancel its response |
| RS | Not asserted | Assert if owned. If asserted, memory will not respond, or will cancel its response |
| WB | Not asserted | Only initiator asserts Owned if the block is NOT owned in initiator. If Owned is asserted, memory will not write memory, but the data transfer will complete on the bus as if Owned was not asserted |
| INT | Target asserts to NACK interrupt. If Shared is asserted, the initiator may drive a data packet | |
| WS<br>RIO<br>RBIO<br>WIO<br>WBIO<br>ADM | Not asserted | Not asserted |

[1]If Shared is asserted on an RTO, a cache owning the data is not allowed to respond and will cancel the response The Share ("S") State Signal:

There are sixteen Shared ("S") signals, one per board. Each board drives its own Shared signal and reads all other Shared signals. As noted in Table 2, Shared signals are multiplexed onto Address bus pins. The Shared signal is driven five cycles after the first cycle of the Address Bus cycle with which it is associated.

The Owned ("O") State Signal:

The Owned state signal is driven six cycles after the first cycle of the associated Address Bus packet, and is multiplexed onto the DataID Bus (see FIG. 6).

The Shared and Owned state lines are to be driven even if the board does not actually have the data for the line. A board is the owner for a line from the time it initiates a ReadToOwn transaction on the Address bus to the time it relinquishes ownership. Ownership is relinquished when the board initiates a WriteBack transaction for the line on the Address Bus, or when another board initiates a ReadToOwn or a WriteStream transaction for the line on the Address Bus.

Similarly, a board is said to have a line for purposes of asserting the Shared signal from the time it initiates the ReadToShare or the ReadToShareAlways transaction on the Address Bus. The board retains this line until such time as the line is replaced in cache or until another board initiates a ReadToOwn or WriteStream transaction for the line.

Each plug-in circuit board preferably has multiple devices, and will act on behalf of all of its devices. A board will therefore assert the Shared and Owned signals for its own transactions if the line is shared or owned by any one of its devices.

The Mapped ("M") State Signal:

The Mapped state signal is used to indicate to the initiator that a transaction will receive a response. If Mapped is not asserted, the initiator knows that it will not receive a response and that the appropriate error should be reported. The Mapped signal preferably allows sufficiently lengthy time-outs to be treated as fatal hardware errors rather than as nonfatal errors. The Mapped signal is driven six cycles after the first cycle of the associated Address Bus packet (see FIG. 6). As noted by Table 6, Mapped is multiplexed on to the DataID Bus.

For all transactions to cacheable space (i.e. RTS, RTSA, RTSF, RTO, RS, WB, WS), Mapped is asserted by the board having the corresponding memory line, even if the line is owned by a cache at the time. For Interrupt transactions, the destination of the Interrupt (if any) asserts Mapped, even if the destination cannot accept the interrupt at that time. For non-cacheable read and write transactions, a board will assert Mapped if it is the responder for that transaction. Mapped preferably is not asserted for Admin packets.

The Ignore ("I") State Signal:

The Ignore signal is multiplexed into a pin of the Address bus, as shown by Table 2. The Ignore signal is valid five cycles after the first address cycle (see FIG. 6). If Ignore is asserted, the Address Packet is ignored by all devices except the device asserting Ignore. The Ignore-asserting device should later reissue the same (or equivalent) transaction with the same transaction ID. In the preferred embodiment, Ignore can only be asserted for coherent transactions and interrupts, and cannot be asserted for IO reads, IO writes, or admin packets.

The Ignore signal may be used to logically re-order Address Bus transactions to implement distributed shared memory. Ignore allows a board that implements distributed shared memory to insert a different transaction before the transaction for which it asserted Ignore, and to then reissue the transaction. If Ignore is asserted, the state of the line does not change. In the preferred embodiment, Ignore should not be asserted without distributed shared memory.

Further use of the Ignore state signal is disclosed in U.S. patent application Ser. No. 08/675,284 entitled METHOD AND APPARATUS OPTIMIZING GLOBAL DATA REPLIES IN A COMPUTER SYSTEM, filed on even date herewith and assigned to the assignee of the present application. As disclosed therein, in a global network comprising several bus systems 20 that form an omnibus system, a global reordering of transactions results from use of the Ignore signal. The Ignore signal is issued when an Address Bus transaction is sensed that should be reordered. A typical candidate for such a re-orderable transaction would be the case of a CPU request for data from an address location whereat the data stored is not valid in the memory. To permit such transaction to otherwise occur would promulgate dissimilar versions of data, to the detriment of system 10. A globally-maintained dynamic entry contains all cache lines within the memory distributed among the various circuit boards comprising system 10. For each cache line in the distributed memory system, a global network interface unit maintains two-bits of associated state, which defines four states, namely INVALID, SHARED, OWNER, or MODI- FIER. Within the omnibus, the various STATE SIGNALS 100 indicate the state of the line addressed by the Address Bus packet and provide these four state signals as shown earlier in Table 11.

If a CPU requests a cache line that is in the Invalid state, e.g., seeks data that is not valid in memory, the ignore mechanism issues an IGNORE signal via the STATE lines within the omnibus 20. The various STATE signals, memorialized within the state table in the global network interface have the precise same states as the DTAG RAM units 220 within the various circuit boards. Because it is possible that data stored in a particular location within the distributed memory for system 10 may be invalid, the associated STATE signal for that cache line will be invalid, and thus the IGNORE signal will be asserted.

When the IGNORE signal is asserted, the practical effect is that all address controllers 180 coupled to the omnibus function as though the subject transaction had not occurred. The subject memory address (in which an invalid version of the desired data is retained) may still be accessed, but to no practical purpose since another memory location (which may be anywhere physically) holds the valid version of the desired data. When any CPU or other device attempts to access a cache line associated with an invalid state, as signified by associated memory TAG (or "MTAG"), global network interface will cause the IGNORE signal to be asserted.

As noted with respect to FIG. 5, state signals IGNORE and SHARE "(I,S)" are asserted with common timing five cycles after a transaction drives the relevant Address Bus coupled to the sub-system containing the requesting CPU device. Thus, in the preferred embodiment there is a five-cycle latency before the IGNORE signal is asserted. Interestingly, the address controller 180 associated with the circuit board containing the requesting device will not even see on the omnibus the transaction it requested. This is because within each address controller there is a coherent input queue 182 ("CIQ"), as well as a buffer queue 184. Each address controller loads into its associated CIQ all coherent transactions in which it is interested, e.g., its own transactions.

In the preferred embodiment, an asserted IGNORE signal blocks all address controllers from adding an IGNORE-flagged transaction into each address controller's coherent input queue. Thus, not even the address controller associated with a requesting device can load an IGNORE-flagged transaction into its own coherent input queue. The practical effect is that the IGNORE-flagged transaction does not become asserted upon the omnibus system and thus in a temporal or timing sense, the transaction has not yet occurred. The transaction will be reissued by the device that asserted the IGNORE signal.

Thus, in FIG. 8, time slot 0 may represent initial issuance of a valid address request. Alternatively, time slot 0 may denote a subsequent reissue of the same request, whose initial issuance was prevented by an IGNORE state signal that prevented loading the transaction into the relevant coherent input queue within the associated address controller.

An individual address controller can learn from the sourceID associated with a transaction appearing on the omnibus whether a given transaction is relevant to that address controller, e.g., to a device associated with the circuit board on which the address controller exists. Further, the address controller can learn from the omnibus whether the cache line for a subject transaction is in an unusual state, for example by another device requesting a cache line for which the address controller holds a modified copy.

Preferably Used Status Signals:

The preferred embodiment provides three status signals: ECCValid, DCESel, and DataCancel/Error. These signals are driven for one cycle, two cycles before the first data cycle of the corresponding Data Bus packet. All three status signals are multiplexed on to the DataID Bus as shown by Table 6.

The ECCValid status signal indicates whether the ECC fields in the Data Bus packet are valid to permit using devices that are incapable of generating ECC. ECCValid has meaning only for non-cached operations and interrupts, and has no meaning for cacheable transactions. In the preferred embodiment, all cacheable transactions should have valid ECC, as memory does not track which data has valid ECC.

The DCESel status signal indicates whether the DataCancel/Error is to be treated as DataCancel or Error, as described below in Table 11.

TABLE 11

| Data/Cancel/Error Encoding | | |
|---|---|---|
| | Data Cancel/Error | |
| DCESel | 0 | 1 |
| 0 (select DataCancel) | None | DataCancel |
| 1 (select Error) | Timeout Error | Bus Error |

DataCancel is used to cancel a DataBus packet. But doing so only cancels the Data Bus packet, and does not cancel the transaction. This procedure is used when a Data Bus packet is invalid, or if a "pushed" write-type operation cannot accept the data. These two error codings advantageously permit devices to distinguish between two error types, thus conforming to UPA interconnect architecture.

More specifically, an invalid Data Bus packet can result from Read transactions for lines owned in a cache if the memory begins its response before the Owned signal is available. This condition may result, for example, in an attempt to reduce memory latency.

Alternatively, if a write-type operation is "pushed" by the initiator, the destination cannot accept the data. The destination then cancels the Data Bus packet and assumes the responsibility to "pull" the data, a procedure described later herein with respect to WriteStream, WriteIO, and Write-Block IO operations.

Preferably Used Parity Signals:

Preferably system 30 uses two parity signals, ParityA and ParityD, to protect the State, Status, DataID, and Arbitration signals, with both parity bits encoding even parity.

ParityA is used to protect signal groups driven during "Address cycles", e.g., cycles during which Address Bus arbitration is driven. These signal groups include the Reserved bit in the Address Bus, Owned, Mapped, ECCValid, DCESel, and DataCancel/Error signals multiplexed on the DataID Bus, and the arbitration signals.

ParityD is used to protect signal groups driven during "Data cycles", e.g., cycles during which Data Bus arbitration is driven. These signal groups untidy DataID, the Ignore signal, Shared lines, and Arbitration. Because they are driven in both cycles, it will be appreciated that Arbitration signals are protected by both parity fields. ParityA and ParityD are both multiplexed on to the DataID Bus, and are driven by at most one board, with software selecting the board to drive parity.

FIG. 5 depicts signal timing for ParityA and ParityD. As shown, ParityD is delayed by one cycle from the signals it protects because ParityD is driven in the same cycle as ParityA.

Configuration signals usable with system 30 include clocks, JTAG, and other implementation dependent signals.

Figure 7:
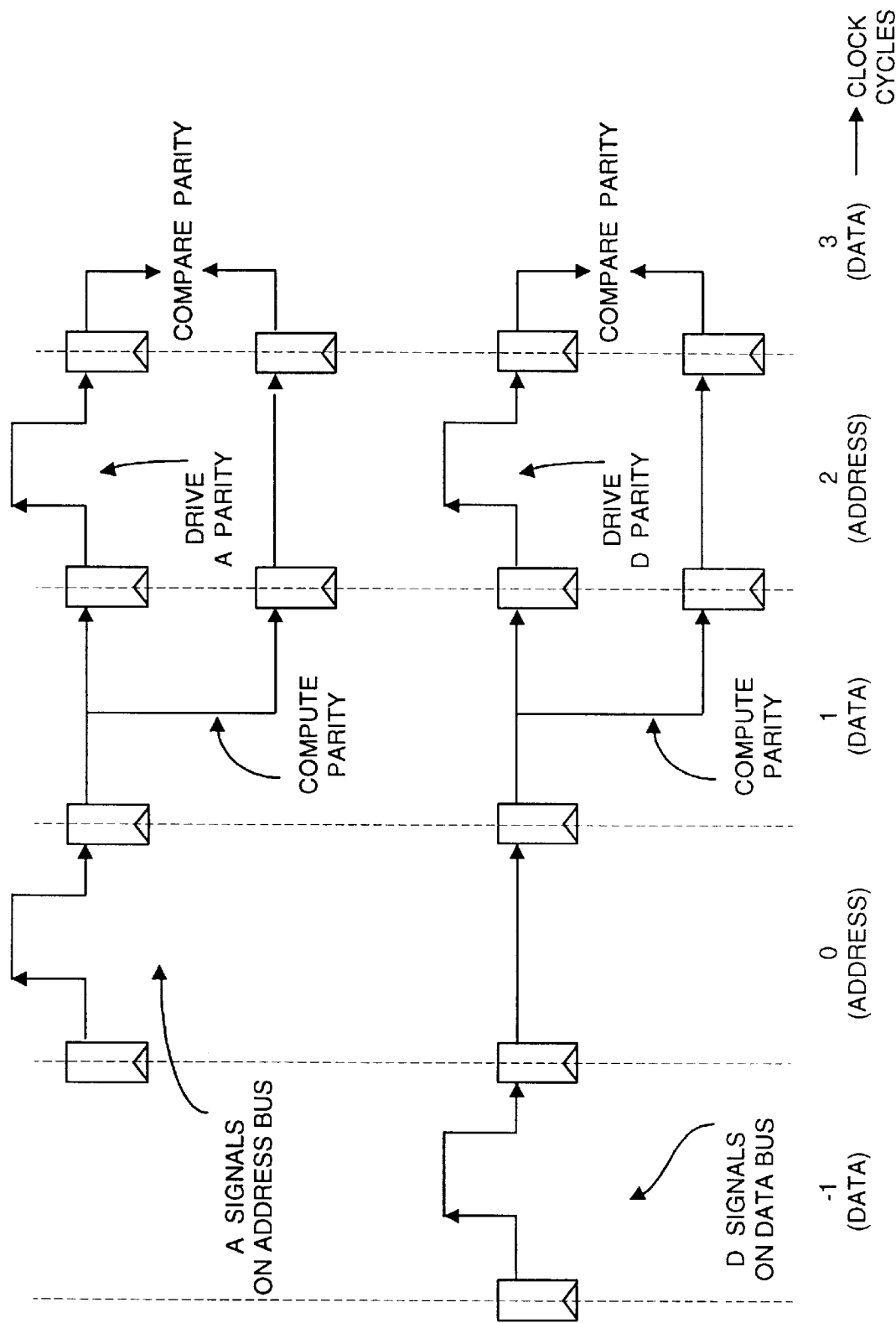
FIG. 7 depicts latency associated with Address Bus and Signal Bus parity comparisons for the system of FIG. 1.

ReadToShareTransaction Timing:

FIG. 6 depicts signal timing relationships for a ReadToShare transaction initiated by Board 1 (e.g., a first circuit board (50-1 in FIG. 1) for Address A, whose home is in Board 2 (e.g., 50-2). In FIGS. 6 and 7, the fixed timing relationships are depicted by numbered solid arrows, whereas causal variable timing causal relationships are shown with dashed arrows. As noted, "A" and "D" denote address and data cycle portions of the master clock signal.

The example of FIG. 6 shows the fastest (e.g., minimum) timing values for these relationships for a read-type transaction. In a write-type operation, the initiator will also arbitrate for the Data Bus. Thus, in a write-type operation, the fastest timing for the Data Bus packet is two cycles earlier.

(1) In the example of FIG. 6, Board 1 takes advantage of fast arbitration for the Address Bus and drives the first of two Address Bus cycles as well as its arbitration lines, in cycle 0. The Address Bus packet is tagged with SourceID i (driven in the next cycle). Had multiple boards been simultaneously driving the Address and Arbitration Buses, the Address Bus would be ignored for those cycles. An arbitration winner would be determined, and the winner would instead drive the Address Bus in cycle 2 as depicted by FIG. 7.

(2) Five cycles after the address cycle appears on the Address Bus, all boards assert appropriate values for the Shared signal and the Ignore signal, denoted collectively as "S,I" in FIGS. 6 and 7.

(3) One cycle after the Shared signal, i.e., six cycles after the first Address Bus cycle, the Boards assert the appropriate value for the Owned signal (see FIG. 6).

(4) Board 2, by virtue of being home to address A, decodes the address and makes an arbitration request for the Data Bus in cycle 3. If it wins the arbitration, it will drive the DataID Bus 2 cycles later with the SourceID i.

(5) Three cycles after driving the DataID Bus, Board 2 drives the Status Signals. DataCancel may be necessary, for example, if the home (Board 2) requests the Data Bus to reduce memory latency. In making such request, the home assumes that it will provide the data, home will cancel its request if in fact another board is the owner.

(6) Two cycles after driving the Status Signals, Board 2 drives the first of two data cycles (d0, d1) on the Data Bus.

Arbitration Timing:

FIGS. 8 and 9 depict fast mode arbitration, with crosshatched Address Bus cycles in FIG. 9 denoting a collision with Board 4. In this example, board 1 wins the arbitration and drives the Address Bus again in cycle 2. Board 4 arbitrates for the Address Bus again in cycle 2 and drives the Address Bus again in cycle 4. The subsequent transaction initiated by Board 4 is indicated in FIG. 9 by shaded blocks.

Data Transfers and Transaction ID Management:

Data transfers are either read-type or write-type. Read-type transfers involve data transfer from the responder to the initiator, whereas Write-type transfers involve data transfers from the initiator to the responder.

Read-Type Data Transfers:

Read-Type Data transfers involve a responder that may be memory or a device. For cacheable transfers, memory may speculatively start a data packet by issuing DataID, but eventually cancel the data packet by asserting DataCancel. (See the description earlier herein with respect to Status Signals, and Tables 7 and 10.) Speculative start and subsequent cancellation can minimize latency for the common case in which cacheable read requests are satisfied from memory. Cancellation can result from various reasons, including assertion of Ignore or Owned for the address packet, or the address packet was a RTO and the initiator asserted Shared (in which case the initiator does not expect any response).

If memory has to cancel a data packet, it issues the DataID for that packet within 11 cycles of the first Address Bus cycle for the transaction (as described hereinafter under rules for transaction Ids). If the responder is a device rather than memory, the data packet is not cancelled.

Write-Type Data Transfers:

Write-Type Data transfers involve first "pushing" data by the initiator, e.g., the initiator arbitrates for the Data Bus and drives the data to the responder. As was described earlier herein with respect to status signals, if the responder is not ready to accept the data, the responder asserts DataCancel to cancel the Data Bus packet. The responder then assumes responsibility to "pull" the data, and will track write-type transactions whose Data Bus packets it has cancelled. When the responder is ready to accept the data, arbitrates for the Data Bus and obtains the data from the initiator, which should be ready to supply the data. If ignore is asserted for a write-type transaction, no data packets should be issued.

Alternatively, if appropriate support were provided from the device interface protocol, protocol for write-type transactions could be simplified. For example, if the mechanism for obtaining write data from the device differed from the mechanism for acknowledging completion of the write operations, one could then have the destination of the write "pull" the data. In that case, there would be no need to specify the "push" followed by the "pull". However, preferably the UPA protocol provides for a common S_REPLY, which serves to obtain the write data from the device and also to signal completion of the write.

The rules for transaction IDs will now be described. Each board has seven unique transaction IDs. To ensure that transaction IDs uniquely identify transactions, the boards should obey the following rules.

Board Rules re Maintaining Unique IDs:

(1) The DataID for a response for a transaction should not occur earlier than the third cycle after the first cycle of the corresponding Address Bus packet;

(2) For write-type transactions in which Ignore is asserted, no data packets should be issued. However, this rule is relevant only for systems in which Ignore is asserted (e.g., a distributed shared memory, or DSM system). In the preferred embodiment, a mode bit is used to prevent data packets from issuing for write-type operations until the value of Ignore is known;

(3) For WriteBack transactions for which the initiator asserts Owned and for which Ignore is not asserted, the initiator will send the Data Bus packet. The home board will either accept the packet or assert DataCancel. If it asserts DataCancel, the Home board will "pull" the data with another data packet. In either case, the Home location will not write memory, and merely discards the data;

(4) For Interrupt transactions for which Shared is asserted and for which Ignore is not asserted, the initiator may send the data packet. If the initiator sends the data packet, the responder may discard the data but should not assert DataCancel;

(5) A transaction ID may be re-used for a new transaction that starts two cycles after the DataCancel time slot for the response to the previous transaction if the response was not cancelled;

For some transactions, the initiator may no longer expect a valid response, yet responders could issue data packets that they subsequently cancel. Because the initiator does not expect a response, the initiator could potentially initiate a new transaction using the same transaction ID. For example, a ReadToOwn transaction for which the initiator asserts Shared does not need a valid response. As a further example, a memory read operation for which a board asserts Owned and responds with the data such that no response from memory is then required.

Board Rules re Not Misinterpreting a Cancelled Response:

To avoid mistaking the cancelled response to the first transaction for a response to the subsequent transaction with the same transaction ID, boards should observe the following two rules. (The following rules do not apply to transactions IDs for which there is no possibility of a subsequent cancelled response.)

(6) The ID for a read-type transaction for which there could be a cancelled response should not be re-used until 14 cycles after the first address bus cycle of the original transaction. Stated differently, there are six Address Bus packet slots after the original Address Bus packet for which the ID cannot be used;

(7) A board should not respond on the DataID Bus with the ID for any transaction that it will cancel later than the 11th cycle after the first cycle of the corresponding Address Bus packet. If the board cannot prevent a response, it should use an idle DataID code rather than the transaction ID of the original transaction.

Transaction Ordering:

With respect to ordering and flow control, the Address Bus provides a single global order that various embodiments may use to implement their specific memory models. Thus, implementation-specific ordering can vary. As described later herein, system 30 may be used with UPA-specified devices.

Cache Coherence:

Cache coherence will now be described. Protocol used with the preferred embodiment permits boards to implement write-back caches with an invalidation-based and ownership-based cache coherence protocol.

Understandably, it can be difficult with such protocols to ensure correct behavior as ownership is transferred from one board to another. In alternative protocols, ownership is transferred along with the data (i.e. along with the response), but the correct owner is always expected to respond to requests. Ensuring a proper response can be difficult when requests come within a small window of the actual transfer of data.

System 30 overcomes this difficulty by distinguishing between the owner and the writer for a line. A board becomes the owner as soon as it requests ownership, using the ReadToOwn Address Bus packet. On the other hand, the writer is the board that actually has the data for the line, which may be dirty. Unless the line is shared, the writer may write to the line.

Authorship (e.g., writing) follows ownership from board to board. This ensures that the order of writes is the same as the global order to ReadToOwn transactions on the Address Bus. Ownership is transferred to another board with Read-ToOwn initiations and is relinquished to the line's home with the board's own WriteBack initiation. Ownership is also relinquished when another board initiates a Writ-eStream transaction. Authorship is transferred or is relinquished with responses that carry the actual data. In practice, the time period during which a board is an owner for a line need not overlap with the time period during which the board is the writer for the line.

The owner may receive other requests for the line even before it actually receives the data. The owner is required to keep track of all such requests, and eventually to respond to all requests, in order, after becoming the writer.

Preferably, the following assertions are required to be true for the described system 30:

(1) There is at most one owner for a line at any time;

(2) There is at most one writer for a line at any time;

(3) A board becomes the owner for a line before it can become the writer for the line;

(4) When there is no writer for a line, the line up-to-date in its home memory; and (5) The order in which ownership for a line is transferred from board to board is the same as the order in which authorship is transferred from board to board.

Invalidation:

Invalidation will now be described. The ReadToOwn Address Bus packet also requests all boards other than the initiator to invalidate their copies of a cache line. By contrast, according to alternative prior art invalidation protocols, invalidation is not considered complete until all boards acknowledge their completion of invalidation. However, such protocols are difficult to implement efficiently on a large system, such as systems with which the present invention may readily be practiced.

As system 30 is preferably implemented, the response (from owner or from home if there is no owner) completes the transaction without waiting for acknowledgments from other boards. However, invalidations are queued in all the boards having the line. Since all coherent bus transactions from a board are completed in order from the queue, invalidation will be completed before any subsequent coherent transactions.

Similar to ownership, a line becomes shared with a ReadToShare or ReadToShareAlways Address Bus packet, rather than with a response Data Bus packet.

Cache coherence and ordering for the preferred embodiment of the present invention using UPA devices will now be described with reference to FIG. 3. Because UPA specifications are known to those skilled in the relevant art, they will not be set forth herein. In the preferred embodiment, system 30 supports UPA interface compliant devices, but differs in some ways from "UPA Interconnect Architecture". Thus, one should recognize the difference between UPA Interconnect Architecture specification (e.g., a specification for a particular system implementation as a whole) and any future "UPA Interface" specification (e.g., a specification for the interface between the UPA devices and the system). "UPA Interconnect Architecture" per se can be unduly restrictive when enabling efficient implementations of larger systems 10, such as preferred herein. Such undue restrictions include waiting for acknowledgments for invalidations from all devices before acknowledging the transaction causing the invalidation, as well as various index and address blocking rules.

Per UPA specification, waiting for acknowledgements for invalidations from all devices before acknowledging the invalidation-causing transaction is relatively simple. For small systems, complexity is avoided because the system controller ("SC") preferably is a single chip with point-to-point links to each UPA port in the system, but is hard to do efficiently for a larger system. In interface 30, however, Address Controller 180 does not wait for acknowledgments for invalidations, yet known memory models are still implemented, including for example, the Sun Microsystems SunS memory model. With respect to various index and address blocking rules, since a UPA specification SC is a single centralized entity, index and address blocking can be straightforward for small systems. (Implementation is more difficult for a larger system in which a single-chip SC is impractical.) As noted, interface 30 neither implements nor requires index or address blocking.

Interface 30 further simplifies other aspects that are unnecessarily specified in the "UPA Interconnect Architecture". For instance, a simple three-state Dtags protocol having only O, S, and I states is employed. This protocol is for all practical purposes equivalent to the UPA-specified MOSI Dtag protocol. Interface 30 also permits a mode in which MOESI Etags protocol can be changed to a MOSI protocol, by treating all ReadToShare transactions as ReadToShareAlways transactions.

UPA Device Transaction Ordering:

The AddressBus can define a point whereat a single global order of all transactions may be established, a so-called "point of global visibility". Such single global ordering preferably permits implementing a memory order such as the Sun Microsystems memory order, using the queues shown in FIG. 3, which queues are for a UPA device only (e.g., a CPU) and not for memory.

In system 30, all device requests ("P_REQs") are issued to Address Bus 60 in order, as represented by a Request Out Queue ("ROQ") 176 in FIG. 3. As noted, all coherent requests and interrupts relevant to the device (including foreign coherent requests and its own coherent requests) are placed into the Coherent In Queue ("CIQ") 182 after being "filtered" by Dtags from DTAG RAM 220. All device PIO requests are placed into the Local PIO Queue ("LIOPQ") 183 and all foreign PIO requests to the device are placed in the Foreign PIO Queue ("FPIOQ") 184, as shown in FIG. 3. In general, transactions from each of these queues are handled in order from the head of the queue. One exception is WriteBacks from the device, for which a special optimization is implemented. WriteBacks and victimization (including the functions of the Dvict and Vbuffer blocks) are described further herein.

In addition, as shown in FIG. 3, device P_REQs are placed in two queues, COQ 174 and C1Q 175, depending on the UPA class. Queues COQ and C1Q function to maintain the order of S_REPLYs according to the order of P_REQs for each class as required by the UPA specification.

Data going to and from device 160-N is buffered in two buffers (e.g., true buffers, not queues) Data Out Buffer ("DOB") 186 and Data In Buffer ("DIB") 187, as shown in FIG. 3. Data need not be sent or received in the same order as the Address Bus packet, and the order of Data Bus packets is not related to the memory order.

Coherent Transaction Ordering:

Ordering of coherent transactions will now be described. All coherent transactions are ordered in the same order as they appear on the Address Bus, independent of the UPA class. The transactions are serviced in order from the head of the coherent input queue ("CIQ") 182, as shown in FIGS. 2 and 3. The various coherent transactions will now be individually described.

With respect to the Local ReadToShare, ReadToShareAlways, and ReadStream transactions, an address controller 180 waits for the data for these transactions to arrive and then issues the S_REPLY to the device followed by the data.

Foreign ReadToShare, ReadToShareAlways, and ReadStream are transactions for which the address controller asserted the Owned line, and will therefore provide the data. Note that the device may have since issued the P_WE_REQ on the UPA. This case as well as the case of an SYSIO (which cannot accept any CopyBack S_REQs) will be described separately, below. Address Controller 180 issues the appropriate CopyBack S_REQ to the device (S_CPB_REQ for ReadToShares and ReadToShareAlways, S_CPD_REQ for ReadStream), waits for the P_SACK or P_SACKD P_REPLY, issues the S_CRAB S_REPLY, and loads the data into the DOB. At this juncture, the transaction may be removed from the coherent input queue 182. Preferably using distributed round-robin ARB units 186, Address Controller 180 arbitrates for the Data Bus and transfers the data later. Alternative arbitration schemes may, however, be used.

The Local ReadToOwn transaction involves consideration of two cases. In one case, the device does not have a valid copy of the data, a case treated like other local reads, described above. Address Controller 180 waits for the data to be available in data input buffer ("DIB") 187, issues the S_RBU S_REPW, and then provides the data. In the second case, the device has a valid copy of the data. Here, Address Controller 180 issues an S_OAK S_REPLY to the device without waiting for the data. Because the Address Controller asserted Shared, neither memory nor another cache owning the data will respond with the data.

The Foreign ReadToOwn transaction also presents two cases for consideration. In the first case, the device is not the owner, or the initiator asserted the Shared signal to indicate that it already has the data. Address Controller 180 will issue an S_INV_REQ to the device and wait for the P_REPLY, and no data is transferred. In the second case, the device is the owner, and the initiator does not assert its Shared signal. Now Address Controller 180 issues the P_CPI_REQ to device 160-N, waits for the P_REPLY, issues the S_CRAB S_REPLY, and loads the data into data out buffer ("DOB") 186. At this juncture, the transaction may be removed from the queue. Preferably, ARB unit 186 within Address Controller 180 is used to arbitrate for the Data Bus and transfers the data to the initiator later. (While ARB unit 186 is fast, its low latency is of less importance for Data Bus arbitration than for Address Bus arbitration in the preferred embodiment.)

The Local WriteStream transaction presents two cases for consideration. In the first case, the line is valid in the device. The Address Controller will first invalidate the line in the device by generating and S_INV_REQ, wait for the P_SACK/P_SACKD, and then issue the S_WAB to get the data. In the second case, the line is not valid in the device. The Address Controller can issue the S_WAB and get the data from the device. The transaction can then be removed from the queue, with actual data transfer occurring later.

For the Foreign WriteStream transaction, the Access Controller invalidates the line in the device by issuing a S_INV_REQ, and waiting for the P_SACK/P_SACKD. The transaction can then be removed from the CIQ.

With respect to the Local Interrupt transaction, if the destination of the interrupt cannot accept the interrupt, it would assert the Shared signal. In this case, the AC issues a S_INACK to the device. Otherwise, the Address Controller issues an S_WAB, and loads the interrupt data into the DOB for subsequent transfer to the destination. In the preferred implantation, a device should not send an interrupt to itself; should such an interrupt be sent, a system time-out and reset will follow.

As regards the Foreign Interrupt transaction, if the Address Controller asserted the Shared line for the interrupt, this transaction may be discarded. Otherwise the Address Controller awaits the data, issues the P_INT_REQ to the device, issues the S_WIB S_REPLY, and transfers the data. At this juncture, the transaction is removed from the queue. The device may issue the P_IAK much later (possibly through some action by software), and the Address Controller should not stall other transactions while waiting for the P_IAK.

Victimization and Local WriteBack Transactions:

The Victimization and Local WriteBack transactions will now be described with respect to FIG. 3. For each UPA port, an address control has a single tag ("Dvict") 179 for snooping for a dirty victim, and a single tagged buffer ("Vbuffer") 188 to optimize performance of cache misses with dirty victims. When a victimizing transaction is issued on the UPA (i.e., a read with the DVP bit set), the corresponding transaction within the present invention also has the Victim bit set. For such transactions, the initiator copies the corresponding victim tag from the Dtags into Dvict. Snooping on Dvict is performed similarly as on Dtags. Foreign requests for the line in Dvict may result in the appropriate S_REQ (CPB, CPI, INV) being queued in CIQ, and the Dvict tag may be invalidated by foreign transactions (RTO, WS) in the present invention, similarly as for Dtags.

WriteBacks preferably invalidate a matching tag in the initiator's Dtags or Dvict. Snooping on Dtags as well as Dvict permits WriteBacks to be issued by the UPA before or after the victimizing read transaction. WriteBacks are snooped by the initiator so that the WriteBack can be cancelled if a previous foreign transaction invalidated the line being written back. This is accomplished by the initiator asserting Owned if the line is not owned in its Dtags or Dvict when a WriteBack appears in the present invention.

If a transaction has a clean victim (e.g., the DVP bit is not set in the UPA P_REQ), the tag for the clean victim is not copied into Dvict. The UPA port will be sent S_REQs for the clean victim resulting from foreign transactions appearing before the victimizing read transaction. Since the read request appears in CIQ after the foreign transactions, it is assured that the Address Controller will not forward S_REQs for the clean victim after the S_REPLY for the read.

At the UPA interface, WriteBacks are handled somewhat differently from other transactions for performance considerations, as well as to handle the SYSIO, which cannot accept S_REQs (copybacks or invalidates).

If there are no outstanding P_REQs from the device in the same class as the P_WB_REQ, the Address Controller waits for any outstanding S_REQs to complete and then issues the S_WAB S_REPLY to the device, possibly before the transaction appears on the present invention. The Address Controller 180 buffers the data in the DOB 186, and maintains the tag for the line in the Vbuffer 188 (see FIG. 3). At this juncture, the owner is the Address Controller and not the device. The Address Controller will service all foreign requests for the line without issuing S_REQs requests to the device. This is done by checking copyback/invalidate requests at the head of the queue against the tag in Vbuffer 188, and data is supplied from the WriteBack data kept in DOB 186. The WriteBack transaction is also queued from the present invention into CIQ 182. Once the WriteBack transaction reaches the head of CIQ 182, by definition all foreign requests for the line have been serviced. At this point the transaction may be removed from the queue and the Address Controller relinquishes "ownership" by invalidating Vbuffer 188.

If there are outstanding P_REQs from the same class, or if Vbuffer is already being used by an outstanding WriteBack, then the Address Controller cannot immediately issue the S_REPLY for the WriteBack. In this case, the WriteBack in queued along with the other coherent transactions in the CIQ, and is dealt with in order. Note that since this case does not occur for SYSIO, S_REPLY for WriteBacks from SYSIO will be issued immediately and no S_REOs will be sent to the SYSIO. Foreign WriteBacks are irrelevant to UPA devices and are not put into CIQ.

Vbuffer 188 is also used for optimizing copyback requests. With respect to optimize performance during Foreign Coherent Reads. In practice, if Vbuffer is not being used, the tag for a foreign read (for which a copyback request is sent to the UPA) is kept in Vbuffer, and the corresponding data is kept in the DOB. If a subsequent foreign read hits the Vbuffer, it can be satisfied without a copyback request to the cache. This helps performance when multiple processors request a common line that is owned in another cache. This is a common occurrence, and may occur, for example, when many processors wait for a spinlock. As soon as the processor holding the spinlock releases the spinlock by writing to it, the other processors will miss on the line and make requests to the same cache line owned by the processor releasing the lock.

Ordering of PIO transactions will now be described. Local PIO transactions are placed in the LPQ and are handled when they reach the head of the queue. Read transactions wait for the data before the Address Controller issues the S_REPLY. For write transactions, the Address Controller issues the S_REPLY and loads the data into the DOB, with actual data transfer occurring later.

Foreign PIO transactions are placed in a separate FPQ queue, are handled when they reach the head of the queue. Foreign reads are issued as P_NCRD_REC2 or P_NCBRD_REQ and the data is obtained with the usual P_REPLY/S_REPLY sequence. As always, actual data transfer to the initiator follows later. Multiple foreign writes may be issued to a device, and data is also transferred to the device with the S_REPLY. At this juncture, the transaction may be removed from the queue but the Address Controller will keep track of the P_REPLYs for flow control to the UPA port.

UPA classes and ordering of S_REPLYs involve the expectation by UPA devices that S_REPLYs to their P_REQs within each class will be in the same order as the P_REQs. But where transaction ordering is maintained not based on classes but rather upon whether the operation goes in the CIQ or the LPQ, Address Controller requires a mechanism to ensure that the S_REPLYs are given in the appropriate order. The COQ and C1Q queues provide this mechanism. An S_REPLY for a local transaction at the head of the CIQ can only be issued if it is also at the head of COQ or ClQ. Otherwise a transaction from the LPQ should first be issued an S_REPLY. Similarly, an S_REPLY for a local transaction that is at the head of the LPQ should only be issued if it is also at the head of the C0Q queue or C1Q queue; otherwise a transaction from the CIQ should be issued an S_REPLY first.

In the present invention, UPA classes serve no useful function and indeed complicate the design, as for example in a deadlock case (described below). The P_REQ associated with an S_REPLY is implicit in the UPA because of a requirement that S_REPLYs be ordered within each class. If a different mechanism to match system acknowledgments with device requests existed, one could eliminate UPA classes entirely and thus simplify design of the present invention.

Deadlock can result due to same class non-cacheable and cacheable reads. More specifically, deadlock can occur if the following occur: a first UPA device first issues a non-cacheable read request (NCRD, NCBRD), and then issues a cacheable read request (RDS, RDSA, RDO or RDD), and both requests are outstanding, and the non-cacheable read request and the cacheable read request are in the same class, and the non-cacheable read request is directed to an IO bus (e.g. SBus) on a second UPA device, and a master on the same IO bus has issued a DMA cacheable read request to a location that is owned in the first UPA device. This request appears within the present invention after the cacheable read request from the first UPA, and the IO Bus will not issue a retry to the DMA cacheable read on the IO bus.

In the deadlock case described, the non-cacheable read from the first UPA is issued the S_REPLY first because of class order, but data will not be obtained because the DMA request is holding the IO bus. The DMA request cannot be completed because it is behind the cacheable read request, which cannot be completed because the S_REPLY for the non-cacheable read request should be given first. To avoid this deadlock, a board in the present invention will not issue a cacheable request if a non-cacheable read request of the same class is already outstanding. (In the presently preferred embodiment, only one outstanding read is permitted at a time, thus obviating this problem.)

Flow control for CIQ transactions is implemented in the present invention using a single FlowControl signal in the Arbitration Bus. Beginning two cycles after the FlowControl signal is observed as asserted, no new transactions that would be placed in the CIQ are initiated.

A flow control mechanism is required because it is possible that the CIQ in a device can be blocked (e.g., waiting for a response to a read request issued by the device). During this time, Address Bus packets from other devices can fill the CIQ. Note that in the preferred embodiment, while the total number of outstanding transactions is limited to 112 by the seven outstanding transactionIDs per board, packets in the CIQ may be from transactions that have already "completed", and thus are no longer "outstanding" from the point of view of the Initiator and Responder. Examples of these are ReadToOwn or WriteStream packets for data to be invalidated in the device. Neither the Initiator nor the Responder need wait for the actual invalidation to compete in all other boards.

To prevent deadlock, it should be ensured that any queue on whose behalf FlowControl is asserted will eventually be unblocked. For this reason, FlowControl is not asserted on behalf of FPQ since IO space requests for a device can be blocked by an earlier DMA request from the device. If FlowControl is asserted and the transaction for the DMA request has not yet been initiated, then the transaction will never be initiated, causing a deadlock. Consequently, Flow-Control preferably is asserted on behalf of the CIQ, but not on behalf of the FPQ. Thus, the FPQ should be sufficiently large to accommodate the maximum number of outstanding IO space accesses from all devices.

Flow control for LPQ is unnecessary in the preferred embodiment as the number of outstanding requests from any one device is presently limited by the transaction ID to seven.

Flow control for interrupts will now be described. The P_IAK for an interrupt delivered to a device may be delayed substantially. Thus, as subsequent interrupts will not presently be delivered to the device, a mechanism should be provided to prevent interrupts from stalling other transactions or devices. In the preferred embodiment, each Address Controller maintains a counter for the number of outstanding interrupts issued to each of its UPA ports. If the number is equal to the number of interrupts that the device can accept, the Address Controller asserts the Shared signal for all subsequent interrupts, indicating that the sender should try again. The counter is incremented with each accepted interrupt and decremented with each P_IAK received. Note that the CIQ should not be stalled waiting for the P_IAK.

The present invention can accommodate much overlap between multiple outstanding transactions. In the present embodiment, each UPA port can have up to eight outstanding transactions (outstanding as far as the UPA is concerned), and no distinction is drawn between UPA classes. The UPA device needs to be programmed with the number of outstanding requests per class, and firmware preferably can apportion the eight requests between class 0 and class 1 in any way.

Since each port has a single Dvict tag, after a read with a dirty victim is issued, WriteBack for that read should be issued before the next read with a dirty victim can be issued. However, this still permits multiple WriteBacks and multiple reads with dirty victims to be outstanding on the UPA provided they are "paired" so that only one Dvict tag suffices. There are no further restrictions in terms of the number of outstanding read requests or the number of outstanding dirty victims.

It is noted that the UPA Interconnect Specification is more restrictive and allows multiple reads with dirty victims and multiple WriteBacks to be outstanding only if they are "paired" appropriately and are in the same class. In the present invention, only the "pairing" condition is required, with no distinction being drawn as to UPA class. This implies that future embodiments of the present invention could issue multiple cache misses with dirty victims and still maintain good performance by keeping WriteBacks in a different class from the victimizing read requests.

It will be appreciated that interface 30 provides several advantages over prior art bus-based protocols. In contrast to the prior art, no pending states are required. Thus, the tag state machine may be a simple, fixed pipeline whose transactions depend solely on Address packets and their snoop information. In further contrast, transactions that interact with pending transactions need not be blocked. Instead, interface 30 deals with such interaction using simple pipeline bypasses in the tags pipeline.

As noted, each board can have up to seven outstanding transactions in the preferred embodiment of the present invention, a limit presently imposed by the transactionID size. These seven outstanding transactions are shared by the two UPA ports, with no fixed allocation to any port, e.g., all seven outstanding transactions could be used by the same UPA port.

With further reference to FIG. 1, the various boards 50-N preferably may be inserted into groundplane slots while system 10 is running, a co-called "hot plug". To avoid introducing glitches on signal pins during hot plug board insertion, boards 50-N preferably have different length connection pins. Board pins for precharge power and ground are made longer than other pins, to initially make contact and precharge the board to normal operating levels before any other board pins make electrical contact. Additionally, a set of long "trigger" pins is provided to ensure early electrical contact such that the inserted board asserts a Trigger signal. The Trigger signal is an early warning to other boards 50-N in system 10 that the newly inserted board's signal pins will soon make electrical contact.

After a 16-cycle delay, the other boards assert an internal Pause that prevents them from making new requests on the bus, their internal Master Port timeout counters are halted, and an internal programmable counter is started. The other boards also assert Trigger to de-bounce the Trigger signal, but if Trigger is de-asserted before the 16-cycle delay, the counter is re-started. When the internal counter expires, the boards de-assert Trigger, which continues to be asserted by the board being inserted. The boards also assert an internal Frozen signal to stop looking at the bus. The counter delay allows the boards to complete already started transactions and to then ignore the bus so that any glitches do not cause errors. The counter delay preferably is offset according to the board number to prevent simultaneous release of the Trigger signal by all drivers. Noise from normal signal pins making contact starts, and a set of so-called Engaged pins indicates to the board being inserted that the normal signal pins are being engaged. This starts a delay in the board being inserted, and noise from normal signal pins making contact ceases. After the delay from the Engaged signal expires, the board being inserted de-asserts Trigger, and the other boards in the system de-assert internal Frozen to start looking at the bus again.

To accommodate for mechanical tolerances, the board connectors preferably have one Trigger pin on each end of the connector, and one Engaged pin on each end of the connector. The Trigger signal is the logical OR of the two Trigger pins, whereas an Engaged signal is the logical AND of the two Engaged pins.

Timing constrains are imposed for de-glitching during a hot plug insertion. In the following notation, Ti corresponds to a sequenced event number i. Time interval T4–T3 should be sufficient to complete all outstanding bus transactions, and is about 10 ms in the preferred embodiment. Time interval T2–T1 should be sufficient for the inserted board's power to charge-up sufficiently to assert Trigger. Noise resulting from signal pins making contact should not start before time T5, which means the programmable delay should be short enough to ensure signal pins cannot make contact in that time. Noise due to signal pins making contact should end before time T8, which implies delay T6–T8 (a delay fixed on the board being inserted) should be sufficient long for noise from signal pins to decay. This imposes a lower bound on the speed at which the board is inserted, and delay T8–T6 should be sufficiently long to ensure this is not a practical constraint.

Modifications and variations may be made to the disclosed embodiments without departing from the subject and spirit of the invention as defined by the following claims.

What is claimed is:

1. A method for arbitrating requests among a plurality of contenders for access to a shared resource, the method comprising the following steps:

(a) providing each contender with an arbitration unit that arbitrates a request asserted by a contender for access to said shared resource, each said arbitration unit implementing a prioritized arbitration selection in granting said access to said shared resource, such that said availability of said shared resource is resolved during a same clock cycle as said request is broadcast;

(b) during said same clock cycle, broadcasting to all contenders each said request for access to said shared resource asserted by any contender; and (c) granting a request asserted by a contender based upon contender priority, but denying said request based upon a recent history of access granted to a contender;

wherein a round robin arbitration is implemented by each said contender.

2. The method of claim 1, wherein said shared resource includes an address bus in a computer system, and step (b) includes broadcasting said request for access over an arbitration bus in said computer system, said contenders being coupled to said arbitration bus.

3. The method of claim 1, wherein each said arbitration unit is identical and functions hierarchically.

4. The method of claim 3, wherein said arbitration unit provides at least two low level leaf arbitrators that can each independently arbitrate a leaf-level access grant to a said contender.

5. The method of claim 4, wherein said arbitration unit further provides a high level arbitrator that can independently arbitrate an ultimate grant of arbitration among contending low level leaf arbitrators.

6. The method of claim 1, wherein said arbitration unit further provides:

four low level leaf arbitrators that can each independently arbitrate a low-level access grant to a said contender; and a high level arbitrator that can independently arbitrate an ultimate grant of arbitration among contending said low level leaf arbitrators.

7. The method of claim 1, wherein at step (c) said recent history is memorialized by implementing bit-masking such that a round-robin function is performed in awarding prioritized access grant.

8. The method of claim 6, wherein said arbitration unit further provides for each of said low level leaf arbitrators and said high level arbitrator a last winner pointer;

wherein following an access grant, a pointer at said grant level points to a next-highest priority contender;

wherein at each grant level only contenders rightward of said pointer may win a priority grant unless, but if there no contenders are rightward then a contender leftward of said pointer may win a priority grant.

9. The method of claim 8, wherein said arbitration unit further repoints as needed each said last winner pointer following an access grant at said grant level;

wherein repainting occurs synchronously in all said arbitration units.

10. A method for arbitrating requests among a plurality of contenders for access to a shared resource, the method comprising the following steps:

(a) providing each contender with an arbitration unit that arbitrates a request asserted by a contender for access to said shared resource, each said arbitration unit implementing a round-robin arbitration selection in granting said access to said shared resource such that a request is granted based upon contender priority but may be denied based upon a recent history of access granted to a contender; and (b) broadcasting to all contenders each said request for access to said shared resource asserted by any contender.

11. The method of claim 10, wherein at step (a), said recent history is memorialized by implementing bit-masking.

12. The method of claim 10, wherein said arbitration unit provides at least two low level leaf arbitrators that can each independently arbitrate a leaf-level access grant to a said contender, and further provides a high level arbitrator that can independently arbitrate an ultimate grant of arbitration among contending said low level leaf arbitrators, each of said low level leaf arbitrators and said high level arbitrator having a last winner pointer;

wherein following an access grant, a pointer at said grant level points to a next-highest priority contender;

wherein at each grant level only contenders rightward of said pointer may win a priority grant unless, but if there no contenders are rightward then a contender leftward of said pointer may win a priority grant;

each said arbitration unit further repainting, as needed and synchronously in all said arbitration units, each said last winner pointer following an access grant at said grant level.

13. For use with a computer system that includes an arbitration bus, an address bus, and a plurality of contenders coupled to said arbitration bus and to said address bus and able to assert a request for access to said address bus, an arbitrator system for arbitrating access to said address bus, the arbitration system comprising:

for each contender, an arbitration unit coupled thereto to arbitrate a request asserted by said contender for an access grant to said address bus, each said arbitration unit implementing a prioritized arbitration selection in granting said access to said shared resource;

wherein each request and each grant is coupled to said arbitration bus;

a memory unit storing a recent history of access granted to each said contender;

wherein a request for access asserted by a contender is granted by said contender's arbitration unit based upon contender priority, but may be denied based upon a recent history, stored in said memory unit, of access granted to said contender, availability of said address bus being resolved during a same clock cycle in which said request is broadcast over said arbitration bus;

wherein a round robin arbitration is implemented by each said contender.

14. The arbitration system of claim 13, wherein each contender includes a device selected from a group consisting of (a) a microprocessor, and (b) an input/output unit, and wherein each contender is mounted on a circuit board coupled to said arbitration bus and to said address bus.

15. The method of claim 10, wherein at step (a) availability of said shared resource is resolved during a same clock cycle as said request is broadcast; and wherein at step (b) said broadcasting occurs during said same clock cycle.

16. The arbitration system of claim 14, wherein said arbitration unit includes:

at least two low level leaf arbitrators that can each independently arbitrate a leaf-level access grant to a said contender; and a high level arbitrator that can independently arbitrate an ultimate grant of arbitration among contending said low level leaf arbitrators.

17. The arbitration system of claim 16, wherein said arbitration unit further includes for each of said low level leaf arbitrators and said high level arbitrator a last winner pointer;

wherein following an access grant, a pointer at said grant level points to a next-highest priority contender;

wherein at each grant level only contenders rightward of said pointer may win a priority grant unless, but if there no contenders are rightward then a contender leftward of said pointer may win a priority grant;

said last winner pointer repainting as needed following an access grant at said grant level;

wherein repointing occurs synchronously in all said arbitration units.

18. The arbitrator system of claim 16, wherein communication between said high level arbitrator and each said low level leaf arbitrator includes:

an output line from each said low level leaf arbitrator to said high level arbitrator identifying any contender awarded priority grant by said contender's low level leaf arbitrator;

a winner-to-right output line from each said low level leaf arbitrator to said high level arbitrator identifying a last grantee contender at said grantee contender's low level leaf arbitrator; and an ultimate grant output line from said high level arbitrator to each access granting low level leaf arbitrator.

19. The arbitration system of claim 14, wherein said arbitration unit further includes:

four low level leaf arbitrators that can each independently arbitrate a low-level access grant to a said contender; and a high level top arbitrator that can independently arbitrate an ultimate grant of arbitration among contending said low level leaf arbitrators.

20. The arbitration system of claim 19, wherein said arbitration unit further includes for each of said low level leaf arbitrators and said high level top arbitrator a last winner pointer;

wherein following an access grant, a pointer at said grant level points to a next-highest priority contender;

wherein at each grant level only contenders rightward of said pointer may win a priority grant unless, but if there no contenders are rightward then a contender leftward of said pointer may win a priority grant;

said last winner pointer repainting as needed following an access grant at said grant level;

wherein repointing occurs synchronously in all said arbitration units.

* * * * *

UNITED STATES PATENT AND TRADEMARK OFFICE
CERTIFICATE OF CORRECTION

PATENT NO. : 5,987,549
DATED : November 16, 1999
INVENTOR(S) : Hagersten et al.

It is certified that error appears in the above-identified patent and that said Letters Patent is hereby corrected as shown below:

Column 40, claim 9,
Line 38, delete "repainting" and insert therefore -- repointing --.

Column 41, claim 12,
Line 5, delete "repainting" and insert therefore -- repointing --.

Column 42, claim 17,
Line 7, delete "repainting" and insert therefore -- repointing --.
Line 47, delete "repainting" and insert therefore -- repointing --.
Line 49, delete "repainting" and insert therefore -- repointing --.

Signed and Sealed this

Sixth Day of November, 2001

*Attest:*

*Attesting Officer*

NICHOLAS P. GODICI
*Acting Director of the United States Patent and Trademark Office*